United States Patent
Nguyen et al.

(10) Patent No.: US 10,157,448 B2
(45) Date of Patent: Dec. 18, 2018

(54) FOVEATED VIDEO RENDERING

(71) Applicant: QUALCOMM Incorporated, San Diego, CA (US)

(72) Inventors: Phi Hung Le Nguyen, San Diego, CA (US); Ning Bi, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 80 days.

(21) Appl. No.: 15/270,983

(22) Filed: Sep. 20, 2016

(65) Prior Publication Data

US 2017/0236252 A1    Aug. 17, 2017

Related U.S. Application Data

(60) Provisional application No. 62/294,398, filed on Feb. 12, 2016.

(51) Int. Cl.
     *G06T 3/40*      (2006.01)
     *G06T 19/00*     (2011.01)
     (Continued)

(52) U.S. Cl.
     CPC .............. *G06T 3/4092* (2013.01); *G06F 3/01* (2013.01); *G06T 3/00* (2013.01); *G06T 3/0025* (2013.01);
     (Continued)

(58) Field of Classification Search
None
See application file for complete search history.

(56) References Cited

U.S. PATENT DOCUMENTS 6,327,381 B1    12/2001   Rogina et al.
6,574,352 B1     6/2003   Skolmoski
(Continued)

FOREIGN PATENT DOCUMENTS

EP         2985734 A2    2/2016
JP          5846268 B1    1/2016

OTHER PUBLICATIONS

Furuti C.A., "Map Projections: Star Projections," May 30, 2015 (May 30, 2015), XP055368409, Retrieved from the Internet: URL: http://www.progonos.com/furuti/MapProj/Normal/Projint/ProjStar/projStar.html [retrieved on May 2, 2017] 8 pages.
(Continued)

*Primary Examiner* — Yi Wang
(74) *Attorney, Agent, or Firm* — Shumaker & Sieffert, P.A.

(57) ABSTRACT

Techniques are described for generating and rendering video content based on area of interest (also referred to as foveated rendering) to allow 360 video or virtual reality to be rendered with relatively high pixel resolution even on hardware not specifically designed to render at such high pixel resolution. Processing circuitry may be configured to keep the pixel resolution within a first portion of an image of one view at the relatively high pixel resolution, but reduce the pixel resolution through the remaining portions of the image of the view based on an eccentricity map and/or user eye placement. A device may receive the images of these views and process the images to generate viewable content (e.g., perform stereoscopic rendering or interpolation between views). Processing circuitry may also make use of future frames within a video stream and base predictions on those future frames.

29 Claims, 16 Drawing Sheets

(51) Int. Cl.
*G06T 3/00* (2006.01)
*H04N 13/383* (2018.01)
*G06F 3/01* (2006.01)
*G06T 15/00* (2011.01)
*H04N 13/279* (2018.01)
*H04N 13/106* (2018.01)

(52) U.S. Cl.
CPC ............ *G06T 3/0087* (2013.01); *G06T 15/00* (2013.01); *G06T 19/006* (2013.01); *H04N 13/279* (2018.05); *H04N 13/383* (2018.05); *H04N 13/106* (2018.05)

(56) References Cited

U.S. PATENT DOCUMENTS

| | | | |
|---|---|---|---|
| 7,090,358 | B2 | 8/2006 | Feigel et al. |
| 7,129,981 | B2 | 10/2006 | Berstis |
| 7,850,306 | B2 | 12/2010 | Uusitalo et al. |
| 2004/0178988 | A1 | 9/2004 | Titcomb et al. |
| 2008/0036875 | A1 | 2/2008 | Jones et al. |
| 2010/0001997 | A1 | 1/2010 | Kajikawa et al. |
| 2010/0315414 | A1 | 12/2010 | Lowe |
| 2012/0105310 | A1 | 5/2012 | Sverdrup et al. |
| 2012/0249730 | A1 | 10/2012 | Lee |
| 2014/0247277 | A1 | 9/2014 | Guenter et al. |
| 2015/0264340 | A1 | 9/2015 | Seidl et al. |
| 2015/0317956 | A1 | 11/2015 | Lection et al. |
| 2016/0112713 | A1* | 4/2016 | Russell .............. H04N 19/20 375/240.03 |

OTHER PUBLICATIONS

International Search Report and Written Opinion—PCT/US2016/063103—ISA/EPO—dated May 18, 2017, 25 pages.
Pedzich P., "Abstract", Polish Cartographical Review, vol. 47, No. 4, 2015, pp. 191-201, XP055368411, 11 pages.
ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.
ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
German, et al., "New methods to project panoramas for practical and aesthetic purposes," Computational Aesthetics in Graphics, Visualization, and Imaging (2007), The Eurographics Association, Jun. 1, 2007, 8 pp.
Fong, et al., "Warping Peirce Quincuncial Panoramas," 7th International Congress on Industrial and Applied Mathematics (2011), accessed on Jun. 9, 2016, from https://arxiv.org/ftp/arxiv/papers/1011/1011.3189.pdf, 32 pp.
Fong, "Revolvable Indoor Panoramas Using a Rectified Azimuthal Projection," Expanded version of "An Indoor Alternative to Stereographic Spherical Panoramas" (Bridges 2014), accessed on Jun. 9, 2016, from https://arxiv.org/ftp/arxiv/papers/1206/1206.2068.pdf, 14 pp.
Fong, "Analytical Methods for Squaring the Disc," Seoul ICM 2014, accessed on Jun. 9, 2016, from https://arxiv.org/ftp/arxiv/papers/1509/1509.06344.pdf, 28 pp.
Puentes, et al., "Elucidating Peirce Quincuncial Projection," accessed on Jun. 9, 2016, from http://fwcg14.cse.uconn.edu/program/wp-content/uploads/sites/863/2014/10/fwcg2014_submission_2.pdf on Mar. 16, 2017, 2 pp.
Lambers, "Mappings between Sphere, Disc, and Square," Journal of Computer Graphics Techniques, vol. 5, No. 2, 2016, University of Siegen, Germany, http://jcgt.org, ISSN 2331-7418, accessed on Jun. 9, 2016, from http://jcgt.org/published/0005/02/01/ on Mar. 16, 2017, 21 pp.
Invitation to Pay Additional Fees from counterpart International Application No. PCT/US2016/063103, dated Feb. 23, 2017, 8 pp.
Kuzyakov et al., "Next-generation video encoding techniques for 360 video and VR," Engineering Blog, Facebook Code, Jan. 21, 2016, Retrieved from https://code.facebook.com/posts/1126354007399553/next-generation-video-encoding-techniques-for-360-video-and-vr/ on Feb. 10, 2016, 12 pp.
Second Written Opinion—PCT/US2016/063103—ISA/EPO—dated Feb. 16, 2018 16 pages.

* cited by examiner

FOVEATED VIDEO RENDERING

This application claims the benefit of U.S. Provisional Patent Application 62/294,398, filed Feb. 12, 2016, the entire content of which is incorporated herein by reference.

TECHNICAL FIELD

The disclosure relates to video rendering.

BACKGROUND

In certain types of video rendering, such as 360 (also known as spherical) video and virtual reality, a viewer can perceive multiple different views of the video content. For instance, while a viewer is viewing the video content on a display, the viewer can select a different view from which to view the content. In a virtual reality setting where the viewer is wearing a headset that displays virtual reality content, the viewer can change the position of his/her head and view the video content from a different view. For 360 video, the viewer can interface with the display to change the angle from which the viewer is viewing the video content.

SUMMARY

In general, the disclosure describes techniques for generating and rendering video content based on area of interest (also referred to as foveated rendering) to allow 360 (spherical) video or virtual reality (as two examples) to be rendered with relatively high pixel resolution even on hardware not specifically designed to render at such high pixel resolution. For instance, processing circuitry may be configured to keep the pixel resolution within a first portion of an image of one view at the relatively high pixel resolution, but reduce the pixel resolution through the remaining portions of the image of the view based on an eccentricity map and/or user eye placement. Processing circuitry may perform these operations on images of some or all of the other views, i.e., other than a current view. A device may receive the images of these other views and process the images to generate viewable content (e.g., perform stereoscopic rendering or interpolation between views). Processing circuitry may also make use of future frames within a video stream and base predictions on those future frames.

In one example, this disclosure is directed to a method for generating video content, the method comprising for each of a plurality of cones of fovea, projecting spherical video content of an original video to respective specific views, wherein each of the plurality of cone of fovea corresponds to a viewing direction and the respective specific views comprise a two-dimensional shape; receiving data indicative of one or more areas of interest in the spherical video, the areas of interest indicating a subject of a frame of the spherical video; synthesizing the respective specific views to generate respective foveated views, wherein each of the foveated views includes a first portion having a first pixel resolution comprising the one or more areas of interest and a second portion having a second pixel resolution less than the first pixel resolution of the first portion; and transmitting one or more of the foveated views.

In another example, this disclosure is directed to a method for displaying video content. The method comprising receiving a plurality of foveated views of spherical video, the plurality of foveated views each comprising a central area with a higher resolution than a non-central area; determining a viewing region based one or both of eye tracking data or head orientation data; interpolating one or more interpolated views based on the plurality of foveated views and the viewing region; selecting a display view of the plurality of the one or more interpolated views based on the viewing region; and displaying the display view.

In another example, this disclosure is directed to a device for generating video content, the device comprising a memory configured to store an original video and one or more processors in communication with the memory. The one or more processors are configured to, for each of a plurality of cones of fovea, project spherical video content of the original video to respective specific views, wherein each of the plurality of cone of fovea corresponds to a viewing direction and the respective specific views comprise a two-dimensional shape; receive data indicative of one or more areas of interest in the spherical video, the areas of interest indicating a subject of a frame of the spherical video; synthesize the respective specific views to generate respective foveated views, wherein each of the foveated views includes a first portion having a first pixel resolution comprising the one or more areas of interest and a second portion having a second pixel resolution less than the first pixel resolution of the first portion; and transmit one or more of the foveated views.

In another example, this disclosure is directed to a device for displaying video content, the device comprising a memory configured to store a plurality of foveated views of spherical video and one or more processors in communication with the memory. The one or more processors are configured to receive the plurality of foveated views of the spherical video from the memory, the plurality of foveated views each comprising a central area with a higher resolution than a non-central area; determine a viewing region based one or both of eye tracking data or head orientation data; interpolate one or more interpolated views based on the plurality of foveated views and the viewing region; select a display view of the plurality of the one or more interpolated views based on the viewing region; and output for display the display view.

In another example, this disclosure is directed to a video generation device comprising for each of a plurality of cones of fovea, means for projecting spherical video content of an original video to respective specific views, wherein each of the plurality of cone of fovea corresponds to a viewing direction and the respective specific views comprise a two-dimensional shape; means for receiving data indicative of one or more areas of interest in the spherical video, the areas of interest indicating a subject of a frame of the spherical video; means for synthesizing the respective specific views to generate respective foveated views, wherein each of the foveated views includes a first portion having a first pixel resolution comprising the one or more areas of interest and a second portion having a second pixel resolution less than the first pixel resolution of the first portion; and means for transmitting one or more of the foveated views.

In another example, this disclosure is directed to a video display device comprising means for receiving a plurality of foveated views of spherical video, the plurality of foveated views each comprising a central area with a higher resolution than a non-central area; means for determining a viewing region based one or both of eye tracking data or head orientation data; means for interpolating one or more interpolated views based on the plurality of foveated views and the viewing region; means for selecting a display view of the plurality of the one or more interpolated views based on the viewing region; and means for displaying the display view.

In a further example, this disclosure is directed to a non-transitory computer-readable medium having stored thereon instructions for processing video data that, when executed, cause one or more processors to for each of a plurality of cones of fovea, project spherical video content of an original video to respective specific views, wherein each of the plurality of cone of fovea corresponds to a viewing direction and the respective specific views comprise a two-dimensional shape; receive data indicative of one or more areas of interest in the spherical video, the areas of interest indicating a subject of a frame of the spherical video; synthesize the respective specific views to generate respective foveated views, wherein each of the foveated views includes a first portion having a first pixel resolution comprising the one or more areas of interest and a second portion having a second pixel resolution less than the first pixel resolution of the first portion; and transmit one or more of the foveated views.

In a further example, this disclosure is directed to a non-transitory computer-readable medium having stored thereon instructions for processing video data that, when executed, cause one or more processors to receive a plurality of foveated views of spherical video, the plurality of foveated views each comprising a central area with a higher resolution than a non-central area; determine a viewing region based one or both of eye tracking data or head orientation data; and interpolate one or more interpolated views based on the plurality of foveated views and the viewing region; select a display view of the plurality of the one or more interpolated views based on the viewing region; and display the display view.

The details of one or more examples are set forth in the accompanying drawings and the description below. Other features, objects, and advantages will be apparent from the description, drawings, and claims.

DETAILED DESCRIPTION

Figure 1A:
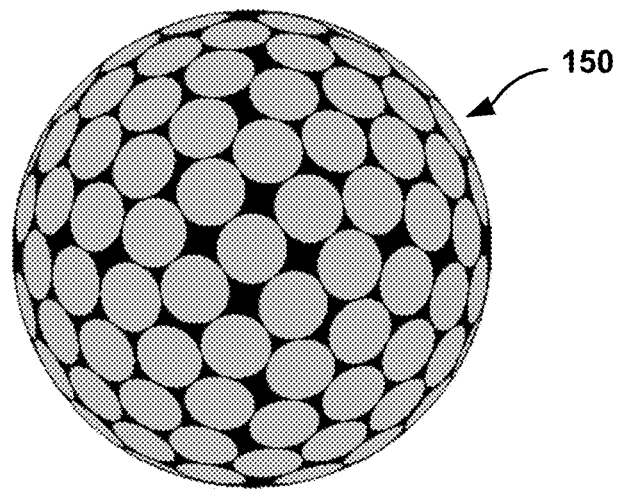
FIG. 1A is a conceptual diagram illustrating a sphere with a plurality of cones of fovea.

In video rendering, 360 video is one of the major use-cases in virtual reality. Existing 360 video format includes cubemaps and equirectangular. Some techniques have achieved 80% file size reduction using a pyramid geometry format. However, there may be some issues with such pyramid geometry format.

For instance, in the pyramid geometry format, the video is uniformly always high resolution across the full entire video image (i.e., the full potential viewers field of view), but the peripheral vision of the human eye cannot make use of that high fidelity (e.g., high resolution). In order to achieve a seamless high-quality viewing experience, the pyramid geometry format technique decodes 9 high-resolution videos simultaneously on the server.

360 video may be typically represented as a sphere. However, the sphere of 360 video may be mapped onto one of a number of different projections to represent the data of the sphere onto a two-dimensional shape so that the image is more conducive to processing. Projections include, for example, cubemaps, equirectangular, pyramids, Peirce-Quincuncial, Adams doubly periodic, Gnomonic, Stereographic Chamberlin trimetric, Berghaus' Star, conformal mapping, truncated pyramid, and /Orthographic projections. Some projections, such as the Peirce-Quincuncial projection may allow "tiling" which may improve encoding efficiency when used during predictive coding.

The fovea centralis or fovea is a small central pit composed of closely packed cones in the eye. The closely packed cones in the central portion of the eye contribute to sharp central vision and allows the eye to see fine detail and color. Outside of the view of the fovea, detail and color representation is diminished. Foveated imaging is an image processing technique in which the image resolution (or image detail) varies across the full entire video image (i.e., the full potential viewers field of view) according to one or more fixation points, which corresponds to the center of the eye's retina, the fovea.

In the techniques described in this disclosure, rather than relying on uniformly high quality viewports (e.g., across the full entire video image (i.e., the full potential viewers field of view)) for each of the views of the 360 video or virtual reality (VR) video, the techniques may utilize images (e.g., video frames) of foveated views of the 360 video or VR video to render image content for display such that at least some views of the 360 video are rendered at varying levels of quality compared to others. In the images of each of the foveated views, there is a first portion having a first pixel resolution and a second portion having a second pixel resolution less than the first resolution of the first portion. In this way, areas that the viewer is likely to observe are kept at high resolution and the resolution of the other areas is reduced (e.g., gradually reduced as the area of the second portion is moved further away from the first portion). For instance, the first portion may be an area or region of interest relative to the second portion. Thus, the video may always be high resolution in the user's field of view, but the peripheral vision of the human eye cannot make use of the higher fidelity image and so is shown a lower fidelity (e.g., lower resolution) image.

Because the pixel density (e.g., resolution) is lower in some portions and higher in other portions, the overall pixel density of each of the images of a foveated view may be such that a graphics processing unit (GPU) can render the images without creating large latencies. For example, a GPU may be configured to render 4 k (e.g., 3480 by 2160 pixels) resolution images at 60 frames-per-second. With the techniques described in this disclosure, the portion having the higher resolution may have resolution greater than or equal to 8 k (e.g., 7680 by 4320 pixels), but the other portions may be much lower resolutions. This allows the GPU to still process the images of the foveated view at 60 frames per second. In general, the techniques may use the maximum frames per second supported by the device and display a resolution that is much denser (e.g., still process at 60 frames per second, but have some image content with 8 k resolution). Because the lower resolution portions of the image frame do not require as much GPU processing resources, additional GPU processing resources can be diverted to processing the higher resolutions area to still achieve 60 frames per second with minimal impact to the viewer experience.

Conceptually, 360 video or VR may be considered as a viewer standing in the middle and being able to view video content all around himself/herself. For instance, with a viewer standing in the middle, a viewing cone extends from the viewer and ends at the perceived distance of the video content. The base of this viewing cone (also referred to as cone of fovea) forms the video content that the viewer would see. In the example techniques described in this disclosure, the video content that a viewer would view, if looking at the base of a particular viewing cone, forms video content for one view. The size of the cone base defines number of cones of fovea and therefore the number of views (e.g., smaller cone base allows for a greater number of views). Each of the cones can be considered as a viewing direction of the video content.

There may be instances where recorded 3D video and computer generated graphics rendering may use different approaches to foveated rendering. In the field of computer generated graphics, pixels are synthesized in (substantially) real time (at e.g., 60 frames per second). Synthesized frames can be buffered and/or saved as they are generated for future use. To generate "future" frames, a system may need to render at least n times the framerate. Additionally, when generating graphics in real time (e.g., for a computer game) future information such as player movement or other generated actions are not known and may only be predicted. This can exponentially increase the complexity for using predictive techniques for graphics generation. Thus, in some examples, graphics foveated rendering may only make use of previous frames because it too computationally expensive to render future frames. In other examples, however, the techniques of the present disclosure can be used in graphics rendering.

In foveated video rendering, there exists a fixed context (i.e., the video file) that a system can use know what will come next. A server may not have to send multiple foveated options to a user device. Instead, the server can determine a few seconds ahead of what the user is viewing based on the head orientation the user device gathers and sends to the server and send one or more foveated views to the user device.

In graphics, geometry may be culled before rendering; this optimization may skip a geometry in one frame and introduce it in the next, which may result in a popping effect. In foveated video, the entire video is known beforehand (i.e., it is not synthesized in real-time like in graphics rendering) so future key frames (e.g., intra-coded frames) can be used to smooth out the transition between views. For example, key frames may be sent as part of a group of views. If a device determines that a user's view is changing (e.g., the user is turning), multiple views may be sent to the user simultaneously based on the predicted movement. All of the views may be sent as part of the group of views along with the key frame.

In one example, machine learning algorithms can sift through the video data and determine which frames/regions are the most important (based, e.g., on an area of interest in the frame) and perform the foveation around those sets of frames/regions. In an example, an encoder may encode multiple future frames (based on, e.g., an estimated movement of a user or an area of interest in a future frame) and send out each option for the future frames simultaneously as part of a group of data along with a key frame.

One way to take advantage of the temporal data is to preserve the scale space representation. For example, salient feature (e.g., area of interest) detection can be applied to the current and future frame to determine which details to preserve. In an example, predictive foveated rendering may be performed by a server. In the example, assume there is an area of interest (or predicted area of interest) in a future frame. A server may select to preserve details in the area of interest in the future frame. This may be done in addition to center-based foveated rendering where areas in the center of a frame are allowed greater texture depth/resolution than outlying areas.

Texture depth within a frame or areas of a frame may be determined by an eccentricity value based on its relationship to a center point in the view or whether the area of a frame has an area of interest. The eccentricity value may be mapped to a different scale of texture on an image pyramid (or mipmap). The image pyramid is conceptually constructed by recursively downsampling an image by reducing (e.g., halving) the width and height. Each downsampled image has the same texture as the original at a different scale. The entire set of images is known collectively as an image pyramid. Different parts of the image pyramid may be sampled for different regions of the frame based on the eccentricity value.

Figure 1B:
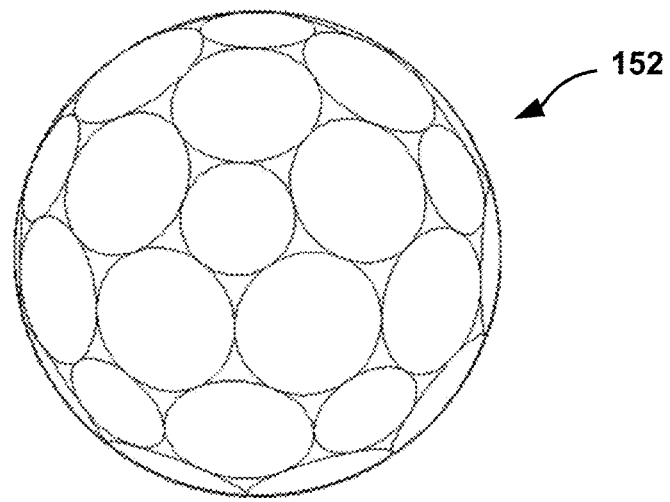
FIG. 1B is another conceptual diagram illustrating a sphere with a plurality of cones of fovea.
Figure 1C:
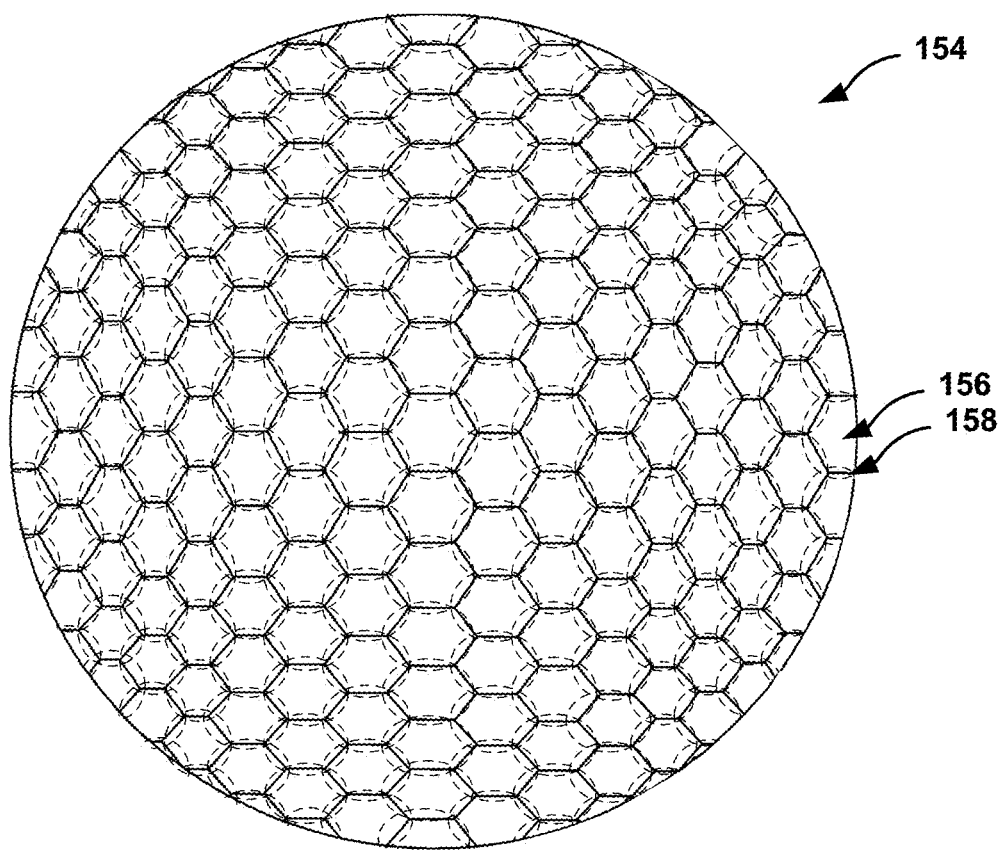
FIG. 1C is another conceptual diagram illustrating a sphere with a plurality of cones of fovea.

FIGS. 1A, 1B, and 1C are conceptual diagrams illustrating a sphere with a plurality of cones of fovea. In FIGS. 1A, 1B, and 1C assume that a viewer is standing in the middle of each respective sphere. FIG. 1A illustrates a sphere with a plurality of identically shaped cones (i.e., with bases of equal size). FIG. 1B illustrates a sphere with a plurality of non-identical shaped cones (i.e., with bases having multiple sizes). FIG. 1C illustrates a sphere with a plurality of hexagonal segments 156 encompassed by a circular cone of fovea.

The surface of the sphere 150 forms the viewing space of the video content, and each of the circles on sphere 150 represent a base of one of these conceptual viewing cones. For instance, if the viewer stared straight up, the viewer would view the video content from the circle on the top of sphere 150. The video content viewable from the bases on the end of each of the circles on spheres 150 and 152 may form one view that may then be processed in accordance with the techniques described in this disclosure.

Furthermore, although sphere 150 illustrates uniform bases (e.g., uniform fovea's cone or viewing cones), the techniques are not so limited. In some cases, depending on the video content (e.g., how many regions of interest), a non-uniform packing of cones, as illustrated in sphere 152, could improve bandwidth savings. In such cases, sphere 150 may be converted to sphere 152.

Sphere 154 illustrates a plurality of hexagonal segments 156. Those of ordinary skill will recognize that the plurality of segments may include any polygon (e.g., triangle, square, rhombus, pentagon, octagon, etc.). Foveated cones surround the hexagonal segments 156 represented by the dotted circles in FIG. 1C. The cones of fovea circumscribe hexagonal segments 156. A system with a user viewing an area covered by two or more distinct cones of fovea (e.g., area 158) may perform a live conversion or synthesize a new view. The views may be interpolated in area 158 such that transitions between cones of fovea are smooth. Additionally, multiple views may be sent by a server to a user device where a user is viewing an area covered by two or more distinct cones of fovea and the user device may interpolate the views or select one of the views.

Figure 2:
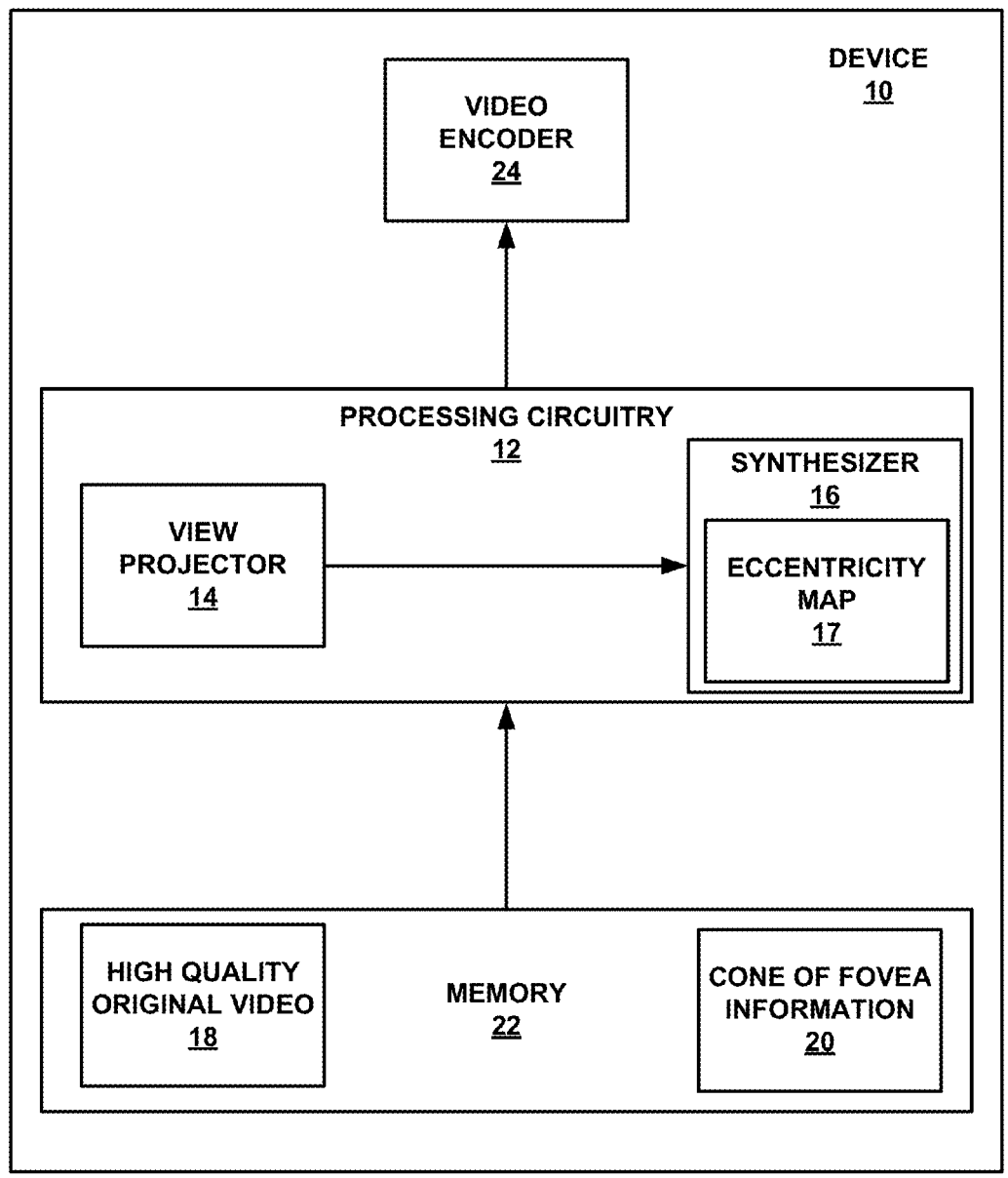
FIG. 2 is a block diagram illustrating an example device for generating video content in accordance with one or more example techniques described in this disclosure.

FIG. 2 is a block diagram illustrating an example device 10 for generating video content in accordance with one or more example techniques described in this disclosure. In some examples, device 10 may be configured to synthesize one or more foveated views. Examples of device 10 include a video content server from which a device access video content and displays the video content. In some examples, device 10 may be the device itself that is to display the video content. In either example, the techniques described with respect to FIG. 2 may be performed offline (e.g., prior to the device processing video content for rendering graphics content for display). However, in some cases, it may be possible for the example techniques described with respect to FIG. 2 to be performed in parallel with the display of the video content.

As illustrated, device 10 includes processing circuitry 12, memory 22, and video encoder 24. In some examples, processing circuitry 12 and video encoder 24 may be formed as integrated circuitry (IC). The IC may be considered as a processing chip within a chip package, such as a system on chip (SoC). In some examples, processing circuitry 12 and video encoder 24 may be housed in different integrated circuits (e.g., different chip packages).

Examples of processing circuitry 12 and video encoder 24 include, but are not limited to, one or more digital signal processors (DSPs), general purpose microprocessors, application specific integrated circuits (ASICs), field programmable logic arrays (FPGAs), or other equivalent integrated or discrete logic circuitry. Memory 22 may be the memory for device 10 or may be local memory to processing circuitry 12 and/or video encoder 24. In this disclosure, memory 22 is described as generally storing information that is used by processing circuitry 12 and video encoder 24 and may be external or internal to processing circuitry 12 and video encoder 24. In some examples, memory 22 may be split between processing circuitry 12 and video encoder 24 and also separately reside as memory for device 10.

Dedicated texturing hardware, such as in a GPU (not shown) in processing circuitry 12, may be used to rapidly interpolate between different scales of texture (e.g. image pyramid). This may avoid the discretization and linearization of foveated graphics rendering solutions (i.e. interpolate between a coarse, medium, high fidelity render targets).

Video encoder 24 may change block compression i.e. which portion of the texture should be decoded at which bitrate. When synthesizing the foveated frame (e.g., a foveated Pierce-Quincuncial frame), the regions away from the eye's location may be blurred out. Video encoder 24 may break up an image into constituent blocks. In an example, a blurry image (e.g., low pixel fidelity) may be described with large blocks as compared to a fine-grained image which video encoder 24 will encode into multiple smaller blocks to describe the level of detail. The fewer blocks to decode may allowing for an improvement in decoding performance. Further, may allow for less data to be transmitted by encoder 24.

In order to blur out those portions away from the eye's location, a graphics processor (such as processing circuitry 12) may either take the higher resolution format (e.g., Pierce-Quincuncial format) and downsample it or compute the appropriate level of detail coefficients (to determine the level of detail in the image pyramid/mipmap) and interpolate at the original high resolution image. The detail coefficients may be calculated by using any arbitrary function. For example, a server may use the distance of the differential surface in the field of view to the user's eye. As the surface moves away from the eye, more details disappear. This translates to moving from the base (finer) level of the pyramid to the coarser (lower resolution) level.

Memory 22 may comprise one or more computer-readable storage media. Examples of memory 22 include, but are not limited to, a random access memory (RAM), an electrically erasable programmable read-only memory (EEPROM), flash memory, or other medium that can be used to carry or store desired program code in the form of instructions and/or data structures and that can be accessed by a computer or a processor.

In some aspects, memory 22 may include instructions that cause processing circuitry 12 to perform the functions ascribed in this disclosure to processing circuitry 12. Accordingly, memory 22 may be a computer-readable storage medium having instructions stored thereon that, when executed, cause one or more processors (e.g., processing circuitry 12) to perform various functions.

In some examples, memory 22 is a non-transitory storage medium. The term "non-transitory" may indicate that the storage medium is not embodied in a carrier wave or a propagated signal. However, the term "non-transitory" should not be interpreted to mean that memory 22 is non-movable or that its contents are static. As one example, memory 22 may be removed from device 10, and moved to another device. As another example, memory, substantially similar to memory 22, may be inserted into device 10. In certain examples, a non-transitory storage medium may store data that can, over time, change (e.g., in RAM).

As illustrated, memory 22 stores high quality original video 18 and cone of fovea information 20. High quality original video 18 may be 360 video or VR video generated at a relatively high video quality (e.g., 8 k or 4 k). High quality original video 18 may be captured by device 10 or a separate capture device (not shown). High quality original video 18 may be captured using a dual fish eye camera or a multi-camera array. The format of high quality original video 18 may include raw video capture or projected into a two-dimensional view (e.g., equirectangular). Cone of fovea information 20 indicates information for each of the N cones that are used to form views for 360 or VR video. For instance, cone of fovea information 20 includes information (e.g., angle and size of cone) for the N cones whose base is illustrated in FIGS. 1A and 1B.

Processing circuitry 12 may be configured to process the video content of each of the viewing directions (as represented by each of the cones of fovea). For instance, if there are N viewing directions (i.e., N bases of fovea cones), processing circuitry 12 may repeat the operations N times. Processing circuitry 12 may repeat the operations N times in parallel, sequentially, or in some combination (e.g., N/2 in first parallel processing round and then remaining N/2 in next parallel processing round).

View projector 14, which may be hardware of processing circuitry 12 or software executing on processing circuitry 12, receives the high quality original video 18 and cone of fovea information 20 from memory 22 and determines the video content of high quality original video 18 that would be viewable for each of the cones having the information stored as cone of fovea information 20 (e.g., determine what is the video content for each cone). View projector 14 may convert spherical video data onto a two-dimensional shape (e.g., the projection) so that the image is more conducive to processing. For instance, each of the cones may be represented by a mathematical equation that defines the size of the cone, and based on the distance of the cone, view projector 14 may crop out the video content that is viewable at the base of each cone. For example, for a given number of cones of fovea, mathematical formulas have been developed to determine the optimal arrangements of the cones on the sphere. For example, in uniform distributions (as is illustrated in FIG. 1A), the sphere packing Tammes problem may be used to determine the locations of the foveated cones. In non-uniform distributions (as is illustrated in FIG. 1B), a right cone rotated in place may be used to determine the locations of foveated cones.

View projector 14 may project the video content for each of the plurality of cones of fovea of high quality original video 18 to respective specific views. The video content is generally spherical, which may not be conducive to processing. View projector 14 may perform a 1:1 pixel mapping to map video content for each of the plurality of cones of fovea of high quality original video 18 to respective specific views that are more conducive to processing. These specific views may be, for example, cubemaps, equirectangular, pyramids, or other views such as Peirce quincuncial projection, Adams doubly periodic projection, Gnomonic projection, Chamberlin trimetric projection, Berghaus' Star projection, conformal mapping, truncated pyramid, and Stereographic/Orthographic projection.

For example, in a cubemap, view projector 14 may project the video content onto the sides of a cube. Spherical data may be projected into a non-curved two-dimensional (2D) space (e.g. the six sides of a cube) which may be more efficiently processed by processing circuitry 12 and/or synthesizer 16. In a more general example, the spherical video content may be projected onto any polyhedron.

Figure 7A:
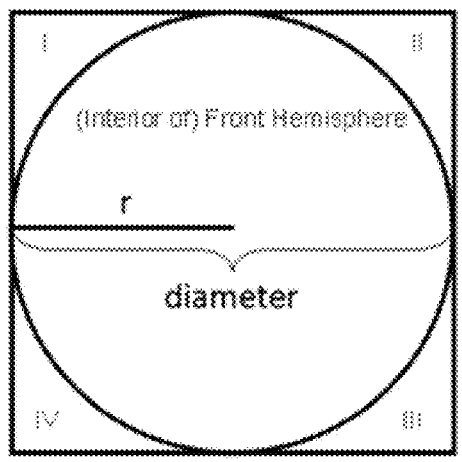
FIGS. 7A-B are conceptual diagrams illustrating a way to map a sphere surface to a square.

Also, in some examples, view projector 14 may map the sphere surface (e.g., such as that illustrated in FIGS. 1A and 1B) to a square (see e.g., FIG. 7A). In some examples, view projector 14 may map the sphere surface (e.g., such as that illustrated in FIGS. 1A and 1B) to a triangle (see e.g., FIG. 10A). Additionally, view projector 14 may map the sphere surface to virtually any shape or projection.

Synthesizer 16, which is hardware of processing circuitry 12 or software executing on processing circuitry 12, receives the respective views from view projector 14 (e.g., via internal bus within processing circuitry 12) and perform foveated synthesis on each view. Any video format (e.g., equirectangular, Berghaus) can be converted into foveated video.

In foveated synthesis, the pixel resolution of a region of interest is kept constant or possibly increased, and the pixel resolution of the rest of the regions is reduced. In general, in foveated synthesis, a first portion of an image (e.g., video frame) of a specific view has a first pixel resolution that is greater than other portions of the image of the specific view.

There may be various ways in which synthesizer 16 synthesizes respective specific views to generate respective foveated views. In some cases, synthesizer 16 may be given additional information (e.g., as part of metadata included in high quality original video 18) to use to determine which region is the region of interest. Synthesizer 16 may use other techniques as well to determine which region is the region of interest such as some depth information, where further away objects are of less interest than closer objects. In some examples, synthesizer 16 may be configured to determine that the region of interest is the center of image, and in such examples, cone of fovea information 20 may be selected such that the center of the base of each of the cones includes the region of interest. In general, synthesizer 16 may use any technique to determine which region is the region of interest, the example techniques are not limited to any particular example.

Once synthesizer 16 determines the region of interest in each of the images of each of the specific views, synthesizer 16 may utilize eccentricity map 17 to generate the foveated view where portions of images of the foveated views have higher pixel resolution and other portions of the images of the foveated views have lower pixel resolution. Eccentricity map 17 defines the algorithm, which may be in the form of a mathematical equation, to smooth transition of the pixel resolution from high to low pixel fidelity. For example, given the location of the pixel in focus (possibly via eye tracking), the Euclidean distance may be computed between that pixel and all the rest. That distance can be fed into eccentricity map 17. Eccentricity map 17 may be pre-configured as part of synthesizer 16 or may be stored in memory 22 for retrieval by synthesizer 16. Synthesizer 16 may use eccentricity maps as discussed with respect to FIGS. 4 and 5 below.

Synthesizer 16 then synthesizes the foveated view based on eccentricity map 17. In some examples, the resolution at center of the view is higher than elsewhere. In other examples, the resolution of portions of the view are based on eccentricity map 17 and may be located outside the center of the view and/or there may be multiple points of interest and therefore multiple areas of high resolution.

In this way, processing circuitry 12 generates a plurality of foveated views, where each view includes a plurality of images. Processing circuitry 12 outputs the images of the foveated views to video encoder 24. Video encoder 24 may then encode the video content from one or more of the foveated views. In some examples, processing circuitry 12 may store the video content of the foveated views in memory 22. Processing circuitry 12 may then instruct video encoder 24 to encode a select few of the foveated views or possibly all of the foveated views by retrieving them from memory 22.

As an example, the device that is to display the video content may output information back to processing circuitry 12 that indicates the viewing direction of the viewer. Based on the viewing direction, not all foveated views need to be encoded and a select few may be encoded (e.g., the foveated view where the viewer is viewing and six more neighboring views, rather than all ten views) since the probability of the viewer turning attention to a view that is not one of these seven views may be relatively low.

Video encoder 24 may utilize any known or developing video encoding process to encode the video content. For example, video encoder 24 may utilize ITU-T H.264 (AVC), H.265 (HEVC), MPEG or other video coding techniques to encode one or more of the foveated views into a video stream. In an example, video encoder 24 may encode a quantization parameter into a bitstream or encoded file. The quantization parameter may alert a decoding device to treat certain blocks as having a lower priority for decoding such that the decoder may spend less effort on the block (e.g. blocks of lower fidelity pixels).

In some examples where device 10 is the device on which the video content is to be displayed, device 10 may not include video encoder 24. In such examples, processing circuitry 12 may store the foveated views in memory 22, and the components used to render the video content may retrieve the foveated views from memory 22.

In examples where the device on which the video content is to be displayed is a different device, video encoder 24 may output the video stream via a channel. The channel may comprise one or more media or devices capable of moving the encoded video data from device 10 to another device. In one example, the channel may comprise one or more communication media that enable device 10 to transmit encoded video data directly to the other device in real-time. In this example, device 10 may modulate the encoded video data according to a communication standard, such as a wireless communication protocol, and may transmit the modulated video data to the other device. The one or more communication media may include wireless and/or wired communication media, such as a radio frequency (RF) spectrum or one or more physical transmission lines. The one or more communication media may form part of a packet-based network, such as a local area network, a wide-area network, or a global network (e.g., the Internet). The one or more communication media may include routers, switches, base stations, or other equipment that facilitate communication.

In another example, the channel may include a storage medium that stores encoded video data. In this example, the device that displays the video content may access the storage medium, e.g., via disk access or card access. The storage medium may include a variety of locally-accessed data storage media such as Blu-ray discs, DVDs, CD-ROMs, flash memory, or other suitable digital storage media for storing encoded video data.

In a further example, the channel may include a file server or another intermediate storage device that stores encoded video data. In this example, the device that displays the video content may access encoded video data stored at the file server or other intermediate storage device via streaming or download. The file server may be a type of server capable of storing encoded video data and transmitting the encoded video data. Example file servers include web servers (e.g., for a website), file transfer protocol (FTP) servers, network attached storage (NAS) devices, and local disk drives.

In the examples described, device 10 is a device for generating video content and includes memory 22 configured to store high quality original video 18 and processing circuitry 12 configured to, for each of a plurality of cones of fovea, project (e.g., with view projector 14) video content of high quality original video 18 to respective specific views, wherein each of the plurality of cone of fovea corresponds to a viewing direction. For example, high quality original video 18 may comprise a 360 (spherical) video and processing circuitry 12 may convert high quality original video 18 to a two-dimensional shape (e.g., a square Pierce-Quincuncial projection or a rectangular equirectangular projection or a triangular Berghaus' Star projection) so that the image is more conducive to processing.

Processing circuitry 12 (e.g., with synthesizer 16) may synthesize the respective specific views to generate respective foveated views, wherein each of the foveated views includes a first portion having a first pixel resolution and a second portion having a second pixel resolution less than the first pixel resolution of the first portion. Processing circuitry 12 may transmit one or more of the foveated views (e.g., to video encoder 24 or memory 22). In some examples, to synthesize respective specific views, processing circuitry 12 is configured to synthesize respective specific views based on eccentricity map 17 that defines a transition in pixel resolution from the first portion through the second portion.

Video encoder 24 may encode one or more of the foveated views into a video stream. In such examples, device 10 may transmit the video stream (e.g. as a bitstream).

Figure 3:
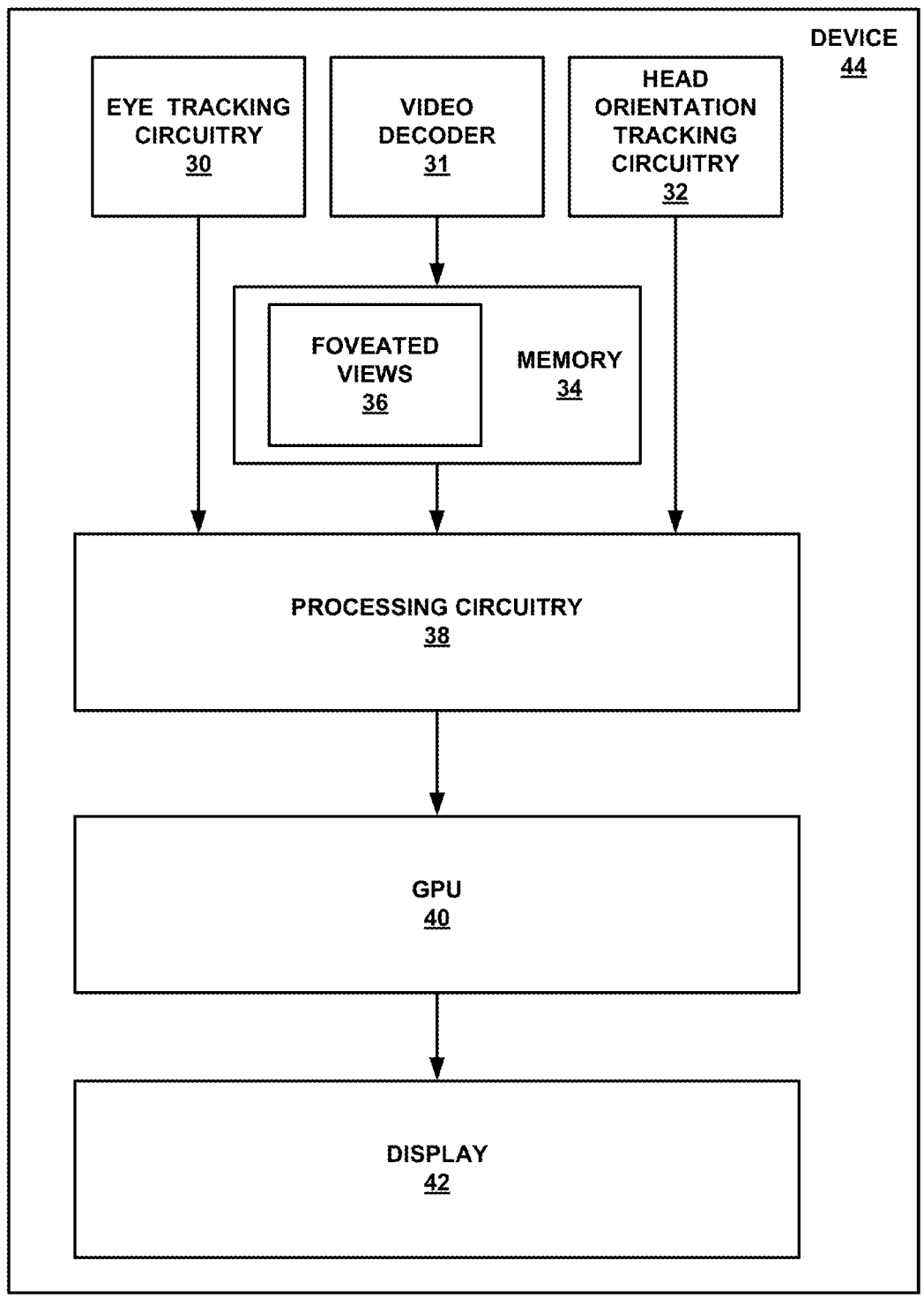
FIG. 3 is a block diagram illustrating an example device for processing video content in accordance with one or more example techniques described in this disclosure.

FIG. 3 illustrates device 44, examples of which include, but are not limited to, video devices such as media players, set-top boxes, wireless communication devices, such as mobile telephones, personal digital assistants (PDAs), desktop computers, laptop computers, gaming consoles, video conferencing units, tablet computing devices, camera, mobile device, broadcast receiver device, a set-top box, and the like. In some examples, device 44 of FIG. 3 and device 10 of FIG. 2 are the same device.

In the example of FIG. 3, device 44 includes eye tracking circuitry 30, video decoder 31, head orientation tracking circuitry 32, memory 34, processing circuitry 38, graphics processing unit (GPU) 40, and display 42. In some examples, such as examples where device 44 is a mobile device, processing circuitry 38, GPU 40, eye tracking circuitry 30, video decoder 31, and head orientation tracking circuitry 32 may be formed as an integrated circuit (IC). For example, the IC may be considered as a processing chip within a chip package, such as a system on chip (SoC). In some examples, one or more of processing circuitry 38, GPU 40, eye tracking circuitry 30, video decoder 31, and head orientation tracking circuitry 32 may be housed in different integrated circuits (e.g., different chip packages) such as examples where device 44 is a desktop or laptop computer. However, it may be possible that processing circuitry 38, GPU 40, eye tracking circuitry 30, video decoder 31, and head orientation tracking circuitry 32 are housed in different integrated circuits in examples where device 44 is a mobile device.

In examples where device 44 and device 10 are the same device, video decoder 31 may not be needed. Also, in such examples, memory 34 and memory 22 may be the same memory and processing circuitry 38 and processing circuitry 12 may be the same processing circuitry. In some examples, GPU 40 may include processing circuitry 38.

As described in more detail below, GPU 40 may render image content that is then displayed on display 42. For ease, GPU 40 is illustrated as outputting to display 42. In other examples, GPU 40 outputs the rendered image content to memory 34 for storage in a frame buffer. A display processor retrieves the image content from the frame buffer and causes display 42 to display the content.

Examples of processing circuitry 38, GPU 40, eye tracking circuitry 30, video decoder 31, and head orientation tracking circuitry 32 include, but are not limited to, one or more digital signal processors (DSPs), general purpose microprocessors, application specific integrated circuits (ASICs), field programmable logic arrays (FPGAs), or other equivalent integrated or discrete logic circuitry. In some examples, GPU 40 may be specialized hardware that includes integrated and/or discrete logic circuitry that provides GPU 40 with massive parallel processing capabilities suitable for graphics processing. In some instances, GPU 40 may also include general purpose processing capabilities, and may be referred to as a general purpose GPU (GPGPU) when implementing general purpose processing tasks (i.e., non-graphics related tasks).

Display 42 may comprise a liquid crystal display (LCD), a cathode ray tube (CRT) display, a plasma display, a touch-sensitive display, a presence-sensitive display, or another type of display device. Similar to FIG. 1, memory 34 may be the memory for device 44. Memory 34 may comprise one or more computer-readable storage media. Examples of memory 34 include, but are not limited to, a random access memory (RAM), an electrically erasable programmable read-only memory (EEPROM), flash memory, or other medium that can be used to carry or store desired program code in the form of instructions and/or data structures and that can be accessed by a computer or a processor.

In some aspects, memory 34 may include instructions that cause processing circuitry 38 and/or GPU 40 to perform the functions ascribed in this disclosure to processing circuitry 38 and GPU 40. Accordingly, memory 34 may be a computer-readable storage medium having instructions stored thereon that, when executed, cause one or more processors (e.g., processing circuitry 38 and GPU 40) to perform various functions.

In some examples, memory 34 is a non-transitory storage medium. The term "non-transitory" may indicate that the storage medium is not embodied in a carrier wave or a propagated signal. However, the term "non-transitory" should not be interpreted to mean that memory 34 is non-movable or that its contents are static. As one example, memory 34 may be removed from device 10, and moved to another device. As another example, memory, substantially similar to memory 34, may be inserted into device 10. In certain examples, a non-transitory storage medium may store data that can, over time, change (e.g., in RAM).

Eye tracking circuitry 30 and head orientation tracking circuitry 32 may be configured to determine position of viewer eye and orientation viewer head, respectively. For examples, although not illustrated, device 44 may include a camera that captures an image of the viewer. Eye tracking circuitry 30 may operate an image recognition algorithm that recognizes eye location and outputs an eye position to processing circuitry 38.

Head orientation tracking circuitry 32 may similarly determine the orientation of the viewer's head. In some cases, device 44 may include an accelerometer or other device by which head orientation tracking circuitry 32 determines the orientation of the viewer head and this may be worn on the head of the viewer.

Head orientation tracking circuitry 32 provides a coarse representation of where the viewer is viewing the 360 or VR video. Eye tracking circuitry 30 provides a finer representation of where the viewer is viewing the 360 or VR video.

Video decoder 31 receives the encoded video content via the channel described above and performs the inverse operations of video encoder 24 (see FIG. 2) to decode the images of the foveated views. In some examples, videos that are near the foveas may be decoded simultaneously. Video decoder 31 stores the images of the foveated views as foveated views 36 in memory 34. In examples, where memory 34 and memory 22 (see FIG. 2) are for the same device, video decoder 31 may not be needed as the foveated views 36 are already stored in memory 34.

Video decoder 31 may decode a quantization parameter from a bitstream or encoded file and may alert video decoder 31 to treat certain blocks as having a lower priority for decoding such that video decoder 31 may spend less effort on the block (of e.g., blocks of lower fidelity pixels).

Processing circuitry 38 receives the output from eye tracking circuitry 30 and head orientation tracking circuitry 32 and determines which of foveated views 36 to select. For example, the output of head orientation tracking circuitry 32 may indicate a general viewing direction of the viewer and processing circuitry 38 may determine which of foveated views 36 includes video content that corresponds to the viewing direction as determined based on the output of head orientation tracking circuitry 32. From the output of eye tracking circuitry 30, processing circuitry 38 may determine which foveated views 36 to select from the foveated views 36 that processing circuitry 38 selected based on the output of head orientation tracking circuitry 32. For example, processing circuitry 38 may select a first set of foveated views 36 based on the output from head orientation tracking circuitry 32 and may select a second set, which is a sub-set of the first set of foveated views 36, based on the output from eye tracking circuitry 30.

Processing circuitry 38 may retrieve the selected foveated views of foveated views 36 from memory 34 and output the foveated views to GPU 40. As another example, processing circuitry 38 may output instructions to GPU 40 to cause GPU 40 to retrieve the selected foveated views from memory 34.

GPU 40 includes a graphics pipeline is configured to perform graphics processing to render image content. The graphics pipeline may include a shader core and a fixed-function pipeline. The graphics pipeline performs functions as defined by software or firmware executing on GPU 40 and performs functions by fixed-function units that are hard-wired to perform specific functions.

The software and/or firmware executing on GPU 40 may be referred to as shader programs (or simply shaders), and the shader programs may execute on the shader core of GPU 40. The shader core and fixed-function pipeline may transmit and receive data from one another. For instance, the graphics pipeline may include shader programs executing on the shader core that receive data from a fixed-function unit of the fixed-function pipeline and output processed data to another fixed-function unit of the fixed-function pipeline.

Shader programs provide users and/or developers with functional flexibility because a user can design the shader program to perform desired tasks in any conceivable manner. The fixed-function units, however, are hardwired for the manner in which the fixed-function units perform tasks. Accordingly, the fixed-function units may not provide much functional flexibility.

Examples of the shader programs include vertex shader program, fragment shader program, and compute shader program. Vertex shader program and fragment shader program may be shader programs for graphics related tasks, and compute shader program may be a shader program for a non-graphics related task.

For GPU 40 to perform its function, a graphics driver executing on the central processing unit (CPU), which may be processing circuitry 38, of device 44 may be configured to implement an application programming interface (API). In such examples, the shader programs may be configured in accordance with the same API as the graphics driver. Graphics driver may be software, executing on hardware (e.g., CPU), in this example. However, some or all of the functionality of the graphics driver may be implemented as hardware.

Graphics driver may be configured to allow processing circuitry 38 and GPU 40 to communicate with one another. The graphics driver may be configured in accordance to an API, although the graphics driver does not need to be limited to being configured in accordance with a particular API. In an example where device 44 is a mobile device, the graphics driver may be configured in accordance with the OpenGL ES API. The OpenGL ES API is specifically designed for mobile devices. In an example where device 44 is a non-mobile device, the graphics driver may be configured in accordance with the OpenGL API. Other example APIs include the DirectX family of APIs by the Microsoft Corporation.

Accordingly, device 44 is an example of a device for processing video content and includes at least one of eye tracking circuitry 30 configured to determine a position of viewer eye or head orientation tracking circuitry 32 configured to determine an orientation of viewer head. Device 44 also includes memory 34 configured to store one or more foveated views 36, wherein each of foveated views 36 includes a first portion having a first pixel resolution and a second portion having a second pixel resolution less than the first pixel resolution of the first portion. Device 44 also includes processing circuitry 38 configured to determine which of foveated views 36 to select based on output from one or both of eye tracking circuitry 30 or head orientation tracking circuitry 32. Device 44 includes GPU 40 comprising a graphics pipeline configured to retrieve the determined foveated views 36 from memory 34 and process the retrieved foveated views to render image content for display.

There may be various functions that the graphics pipeline performs to render image content for display. As one example, the graphics pipeline places images next to one another for stereoscopic rendering.

In some examples, the graphics pipeline of GPU 40 may be configured to perform interpolation between foveated views. For instance, if the viewer eye or head moves slightly, the viewer may not be viewing high fidelity video. To address this, the graphics pipeline may perform interpolation between foveated views as described below.

Figure 4:
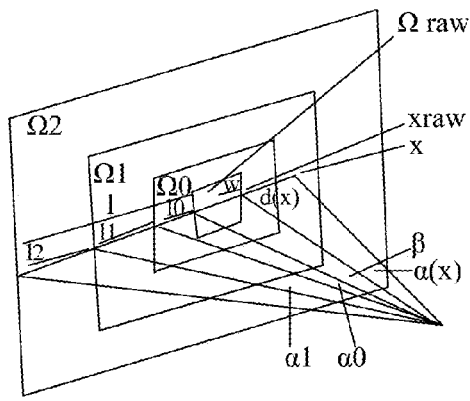
FIG. 4 is a conceptual diagram illustrating one way to maintain high resolution in a first portion and lower resolution in a second portion of a video frame.

The following describes eccentricity mapping in more detail. In examples of foveated rendering, eccentricity mapping may be used to define areas of high and low pixel fidelity. In some examples, regions of interest within a video frame may be defined. These regions of interest may be where a viewer is intended to be looking at the frame, such as the subject of a video frame. In regions of interest, the portions of the video frame have relatively high pixel fidelity/resolution whereas outside the regions of interest portions of the video frame have a relatively low pixel fidelity/resolution. In some examples, multiple (e.g., non-adjacent) regions of interest appear in a video frame (e.g., where multiple characters are in the frame). Additionally, the center of a video frame may be an area of high pixel fidelity/resolution whereas outer areas of the video frame have lower pixel fidelity/resolution. FIG. 4 is a conceptual diagram illustrating one way to maintain high resolution in a first portion and lower resolution in a second portion of a video frame. In FIG. 4, different regions of the frame have different resolutions. While depicted as rectangular regions, regions of the high and low pixel fidelity may be any conceivable shape including rectangular, elliptical/circular, triangular, etc. As illustrated in FIG. 4, the distance between the center pixel and the other pixels located radially about the center is represented as the X-axis while the Y-axis represents the level-of-detail, for example, quality level in the image pyramid.

Figure 5:
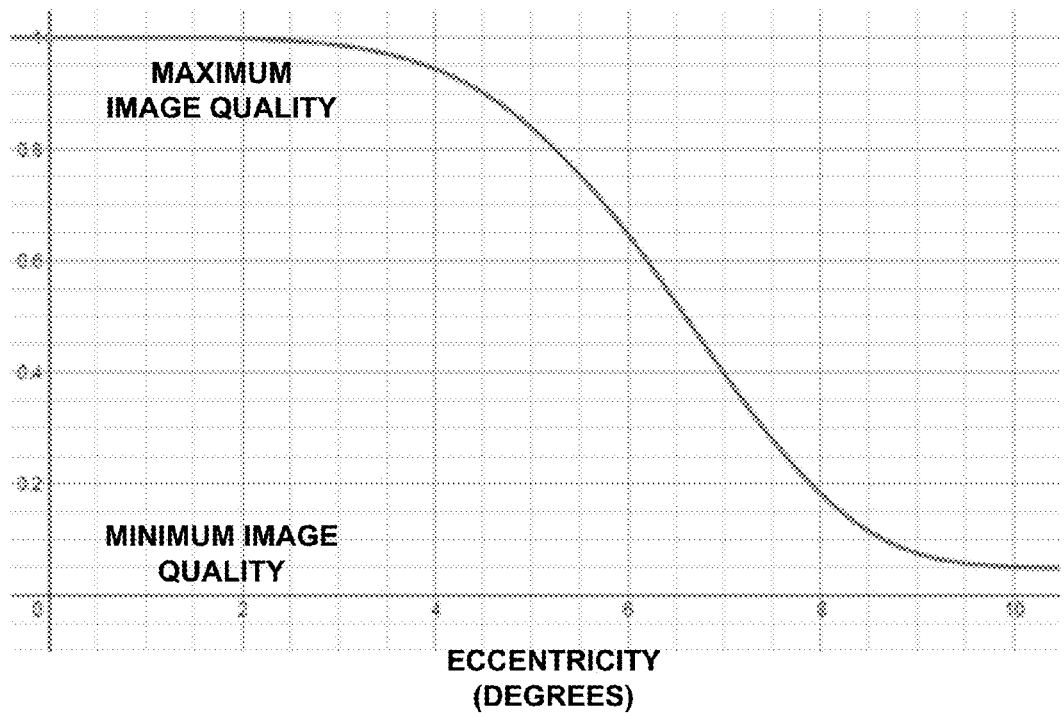
FIG. 5 is a graph illustrating changes in image quality as a function of degrees of eccentricity.
Figure 6A:
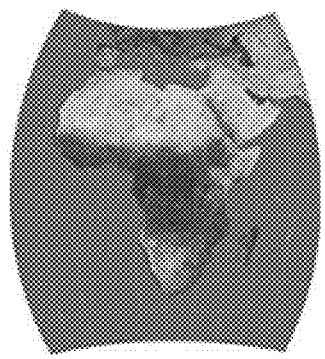
FIGS. 6A-E illustrate various map projections.
Figure 6B:
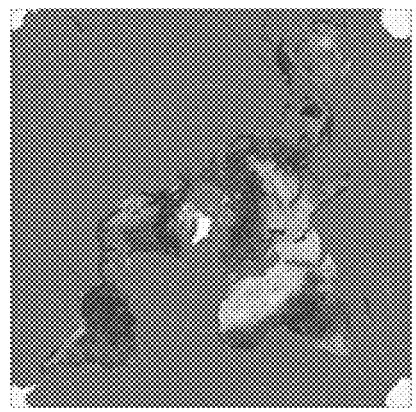
Figure 6C:
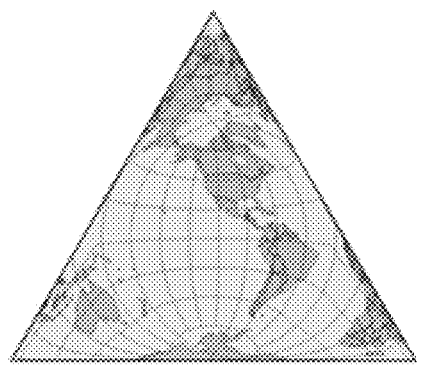
Figure 6D:
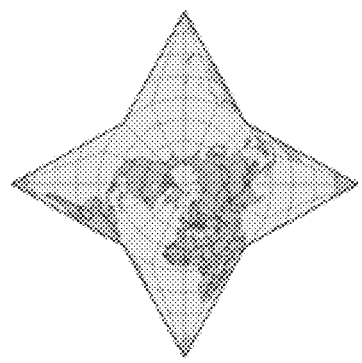
Figure 6E:
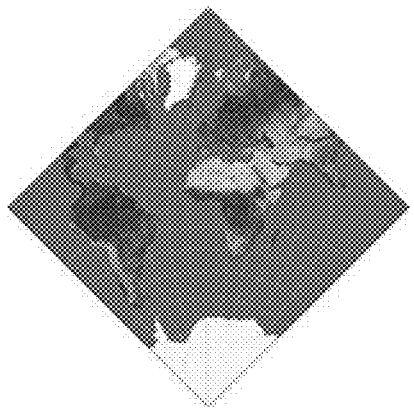

FIG. 5 is a graph illustrating changes in image quality as a function of degrees. In FIG. 5, the eccentricity map may define a smooth transition from high to low pixel fidelity. Three relative regions may be defined in an eccentricity map: an inner region with maximum image quality, an outer region with minimal image quality, and a transition region that bridges the two. Maximum image quality is maintained at close to 0 degrees and drops relative quickly. The center of the eccentricity maps may be the highest quality, which would have an eccentricity of zero. In another example, an area of interest may have an eccentricity of zero whereas the center has a zero or non-zero value. The eccentricity may be a lookup table or an equation evaluated in real time. In one example, pixels located away from the center of the map have a progressively decrease in quality corresponding to an increase in eccentricity. The boundaries of the map may have the largest eccentricity i.e. lowest quality in the image pyramid. The eccentricity function may return a value between 0 and 1 which may be used to retrieve a corresponding level in the image pyramid. The following describes projections. Projections attempt to portray (i.e., map) the surface of a sphere (or sphereoid) as a flat surface or two-dimensional shape. 360 video captures a spherical image/video and may store the image/video in a flat, and in most examples rectangular, view so that the image is more conducive to processing. Projections of a sphere onto a flat surface may introduce distortion onto the projected view.

FIGS. 6A-E illustrates various map projections. Projections include Chamberlin trimetric (FIG. 6A), Peirce-Quincuncial (FIG. 6B), Berghaus' Star Projections (n=3, FIG. 6C; n=4, FIG. 6D), Adams doubly periodic (half shown, FIG. 6E). Other projections, not shown, include, for example, cubemaps, equirectangular, pyramids, Gnomonic, conformal mapping, truncated pyramid, and Stereographic/Orthographic projections. Some projections, such as the Peirce-Quincuncial projection may allow "tiling" which may improve encoding efficiency when used during predictive coding. Each of these projections may be used by view projector 14 to project (e.g. convert) the original video into a specific view. View projector 14 may apply an equation to each pixel location via spatial transform inverse mapping. A GPU on processing circuitry 12 may accelerate this mapping. The GPU may also simultaneously generate the image pyramid.

Figure 7B:
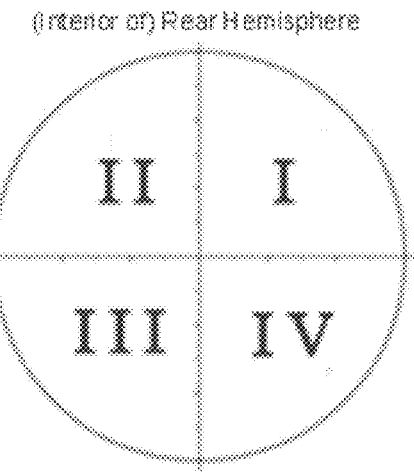

FIG. 7A-B are conceptual diagrams illustrating a way to map a sphere surface to a square. More specifically, FIG. 7A illustrates a sample Pierce-Quincuncial projection. The illustrated projection illustrates one hemisphere as a circle in the center of the square projection. The interior of the rear hemisphere (FIG. 7B) is separated into quarters and mapped to the corners (i.e., hyperbolic triangles) of FIG. 7A. This is shown by having the corresponding roman numerals (I, II, III, and IV) in the quadrant of the hemisphere of FIG. 7B in the corners/hyperbolic triangles of the square of FIG. 7A. In the Pierce-Quincuncial projection, the center portion of the rear hemisphere (i.e. the corners of the quadrants) of FIG. 7B are likewise shown as the corners of the square projection in FIG. 7A. This view creates a split between four of the poles (i.e., center portion) of the rear hemisphere.

Figure 7C:
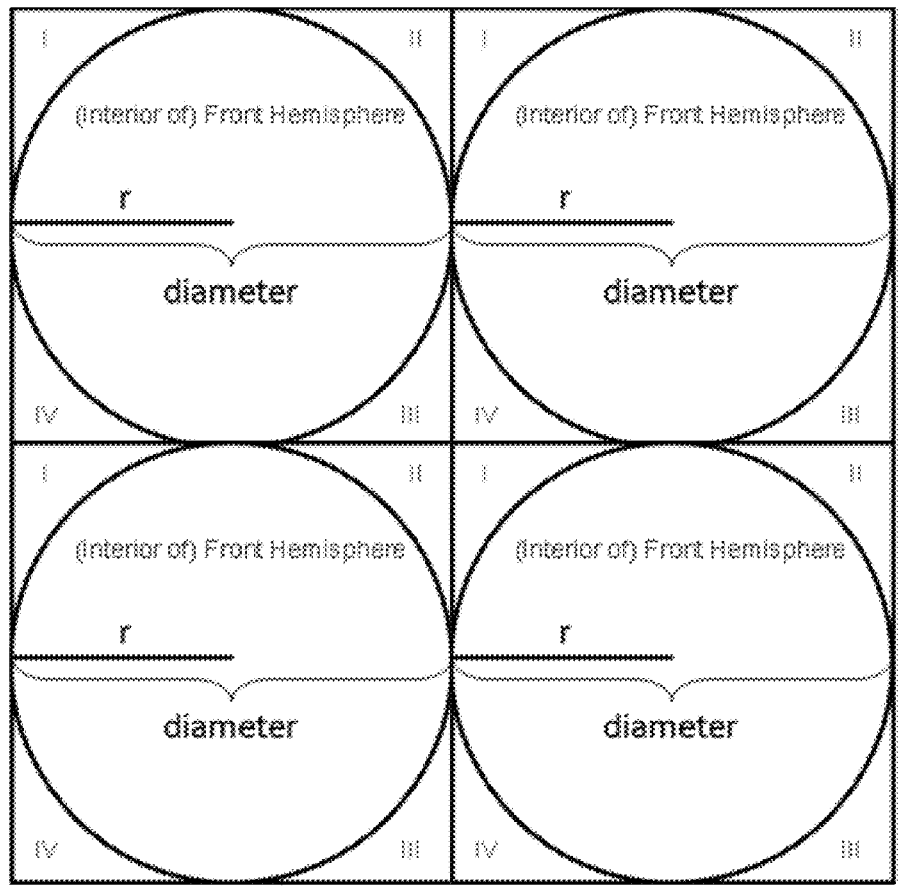
FIG. 7C is a conceptual diagram illustrating a tiling of the Pierce-Quincuncial projection.

A feature of the Pierce-Quincuncial projection is that it can be tessellated (i.e., tiled) in all directions. In other words, repeated copies can completely cover (tile) an arbitrary area, each copy's features exactly matching those of its neighbors. FIG. 7C illustrates an example of tessellation in a Pierce-Quincuncial projection. Tiling allows data to be reduced and avoid seams in the video. For example, when operating on very larger image sizes (e.g., a gigapixel image), the image may be broken up into tiles (e.g., blocks) that can be distributed over many different CPU cores, GPUs, or servers (e.g., within processing circuitry 12 (see FIG. 2)). Dedicated encoding hardware (or, software) can be used to interpolate based on pixels within a frame using the tiling property and wrapping around the projected view. Additionally, the Pierce-Quincunical projection may naturally lend itself to foveated imaging as picture quality is preserved principally in the center portion of the projection (i.e., the fovea) and is most distorted at the periphery (particularly in the corners of the projection of the rear hemisphere) where resolution and pixel fidelity are lower and that distortion is introduced gradually (with four points of distortion). Compared to other projections, however, the distortion of the Pierce-Quincuncial projection may create the least distortion when mapping a three-dimensional sphere to a two-dimensional plane. Further features of the Pierce-Quincuncial projection is that the projection is usable with interpolation, down sampled content, and adaptive scaling.

The Pierce-Quincuncial projection operates in the UV domain (e.g. the three dimensional XYZ domain may be unwrapped to the two-dimensional UV domain) so the actual size of the texture may not matter. Since the mapping between an equirectangular frame and a Pierce-Quincuncial frame is fixed, this may enable a device to apply two optimization schemes (e.g., projection and foveation) on top of the format.

Figure 7D:
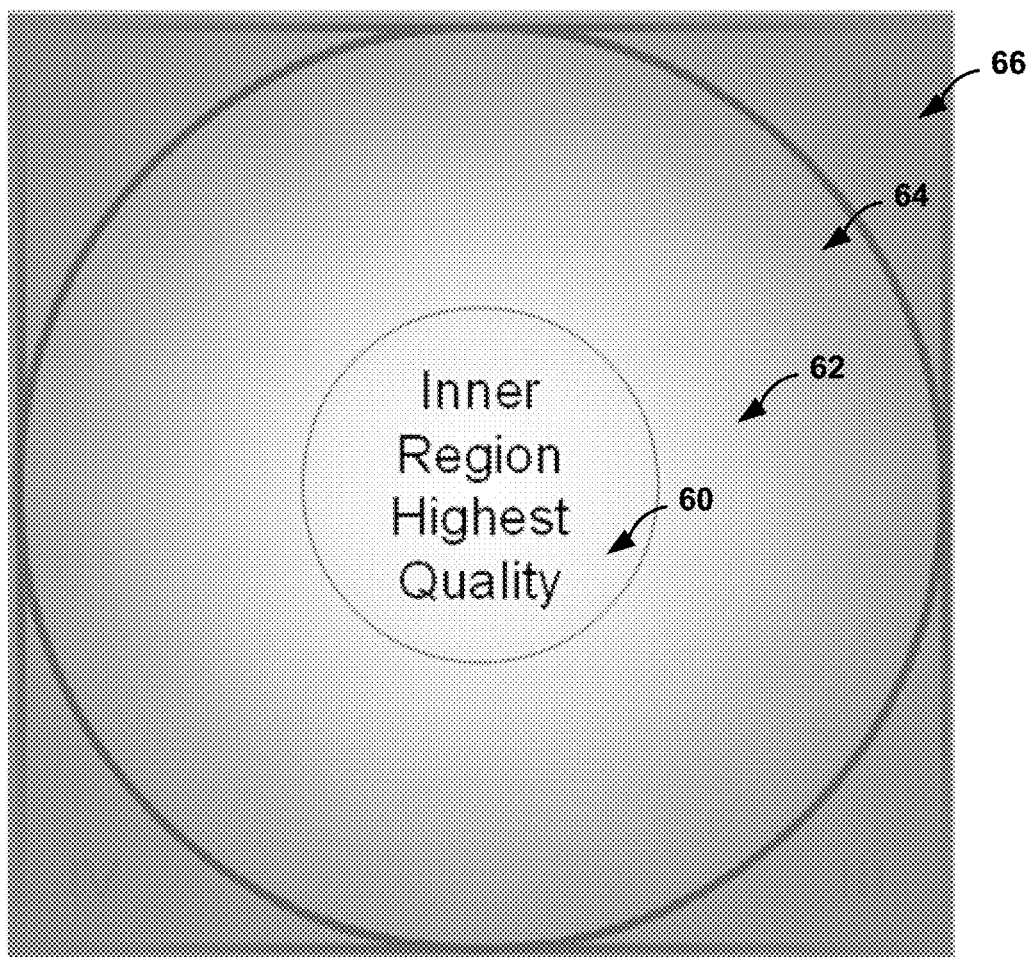
FIG. 7D is a conceptual diagram illustrating different regions of an image having different resolution.

FIG. 7D is a conceptual diagram illustrating different regions of an image having different resolution. For instance, FIG. 7D illustrates the result of foveated synthesizing of an image to a specific view on a Pierce-Quincuncial projection. There is a 1:1 pixel mapping between the inner region and the original video. As eccentricity increases, the resolution becomes coarser. For example, the inner region 60 has original quality 8 K video equivalent resolution. Region 62 has the quality of 4 K video equivalent resolution. Region 64 has the quality of 2 K video equivalent resolution. Region 66 has the quality of 1 K (HD) video equivalent resolution.

Figure 8:
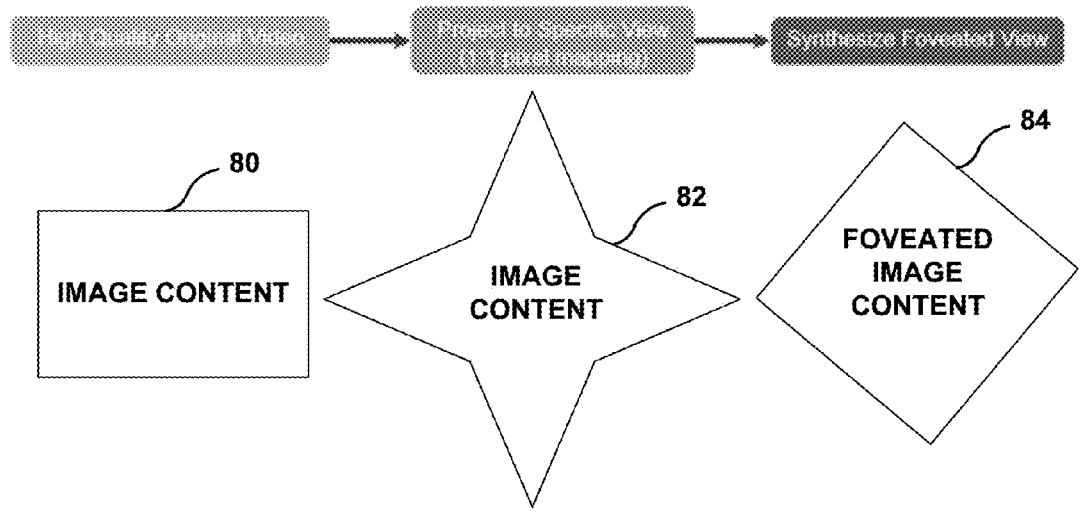
FIG. 8 is a conceptual diagram illustrating an example of a Berghaus Star Projection.

Other projections may also be used, by for example, view projector 14 (see FIG. 2), for foveated imaging. For example, FIG. 8 is a diagram illustrating image content being projected to a specific view and synthesized into a foveated view. High quality original video image content 80 is projected by view projector 14 to Berghaus' Star projection 82 of high quality original video image content 80. There is a 1:1 pixel mapping between high quality original video image content 80 and Berghaus' Star projection 82. Berghaus' Star projection 82 is then synthesized by synthesizer 16 (see FIG. 2) into synthesized foveated view 84.

Figure 9:
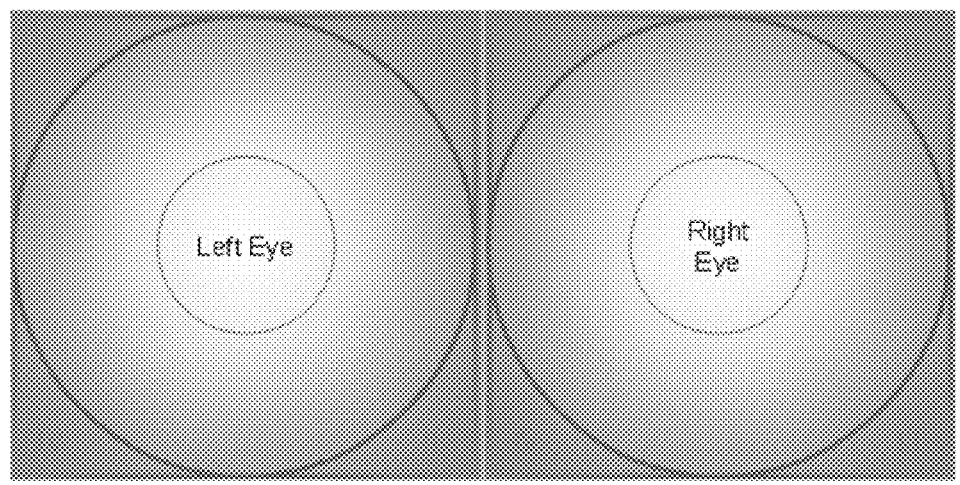
FIG. 9 is a conceptual diagram illustrating square images placed side-by-side for rendering stereoscopic video.

FIG. 9 is a conceptual diagram illustrating square images placed side-by-side for rendering stereoscopic video. The diagram shows a pair of square Pierce-Quincuncial projections, one for the left eye and the other for the right eye.

Figure 10A:
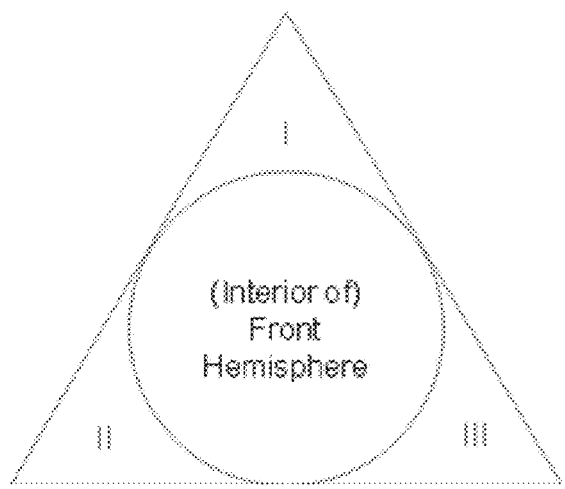
FIGS. 10A-B are conceptual diagrams illustrating a way to map a sphere surface to a triangle.
Figure 10B:
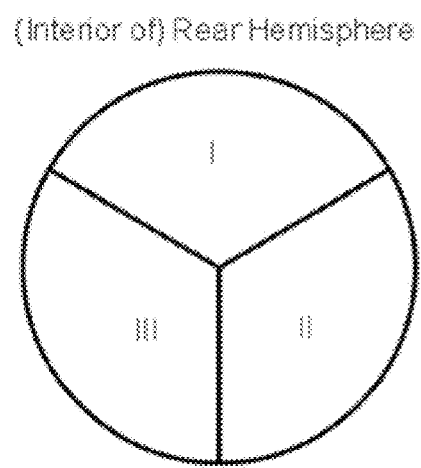

FIG. 10A-B are a conceptual diagrams illustrating a way to map a sphere surface to a triangle. FIG. 10A illustrates a Berghaus' projection (n=3) where one hemisphere is mapped to a circle in the center of the triangular projection. The interior of the rear hemisphere (FIG. 10B) is separated into thirds and mapped to the corners of FIG. 10A. This is shown by having the corresponding roman numerals (I, II, and III) in the third of the hemisphere of FIG. 7B in the corners of the triangle of FIG. 10A.

Figure 11:
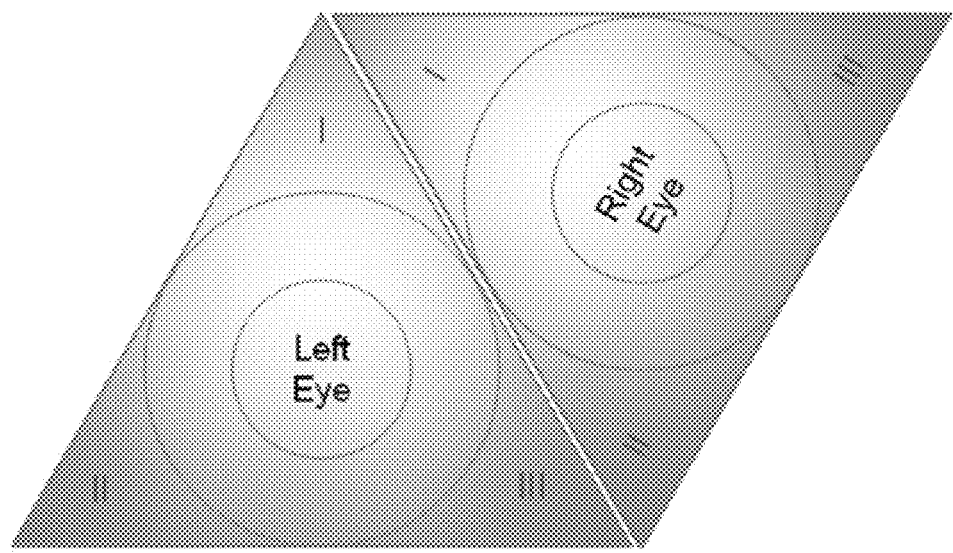
FIG. 11 is a conceptual diagram illustrating triangle images side-by-side forming a rhombus shape for rendering stereoscopic video.

As another example of placing images side-by-side, FIG. 11 is a conceptual diagram illustrating of triangle images side-by-side forming a rhombus shape for rendering stereoscopic video. In FIG. 11, a first foveated view comprises images forming a first set of triangles, and a second foveated view comprises images forming a second set of triangles. To process the retrieved foveated views, the graphics pipeline of GPU 40 of device 10 (see FIG. 2) may be configured to place images forming the first set of triangles side-by-side with respective images forming the second set of triangles to form respective rhombus shapes and render stereoscopic video based on the rhombus shapes. Such a rendering may equate to a more efficient stereoscopic video format by reducing the number of pixels allocated to the peripheral view resulting in lower data transmissions.

Figure 12:
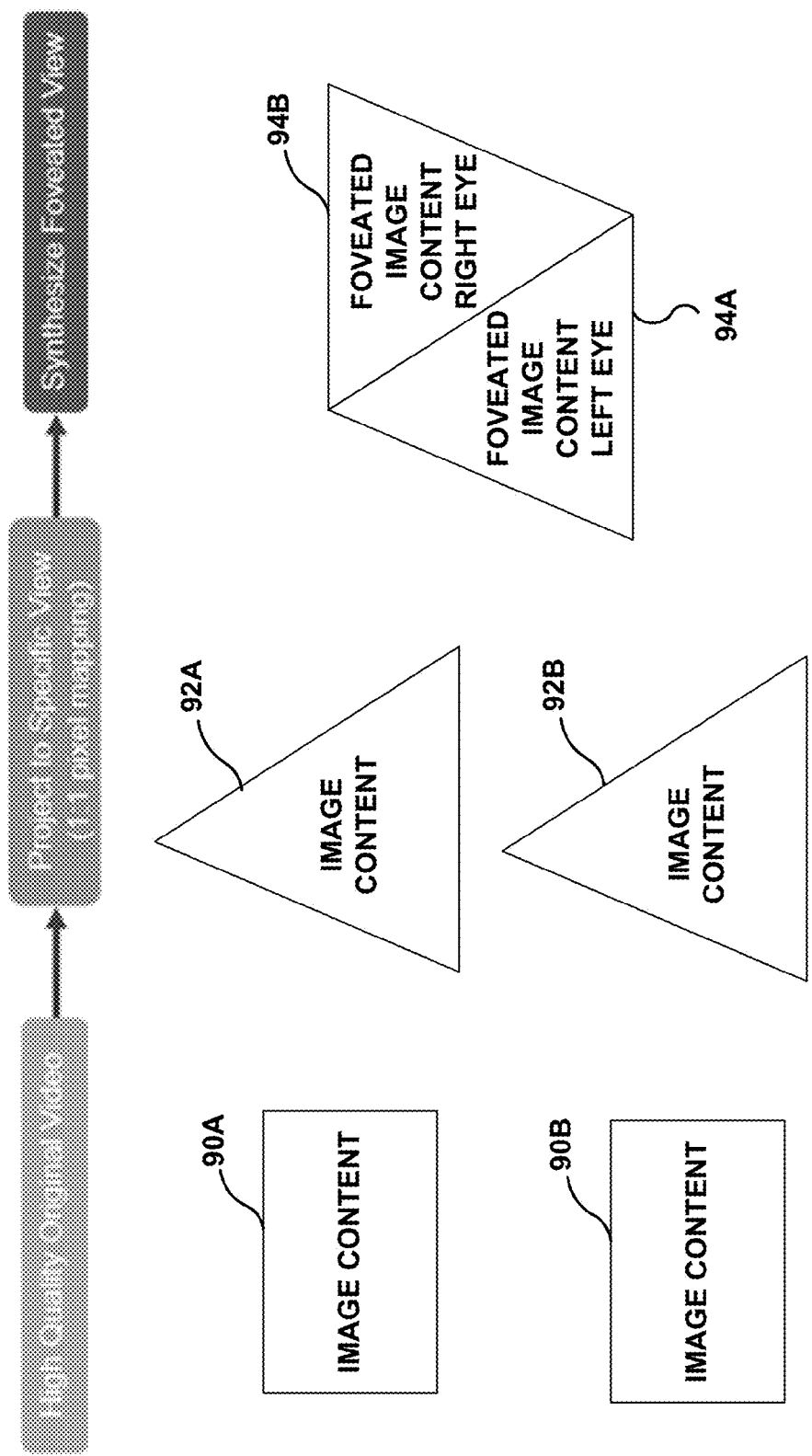
FIG. 12 is another conceptual diagram illustrating an example of a Berghaus Star Projection.

FIG. 12 is another conceptual diagram illustrating an example of a Berghaus Star Projection. FIG. 12 is similar to FIG. 8. Two original videos for a left eye 90A and right eye 90B are projected into a Berghaus Star Projection (n=3) for left eye 92A and right eye 92B. The projected views 92A and 92B are synthesized for viewing and are the triangles foveated image content for the left eye 94A and foveated image content for the right eye 94B are placed side-by-side to form a rhombus shape for rendering stereoscopic image content. Like in FIG. 8, the image content of the rhombus is foveated.

Figure 13:
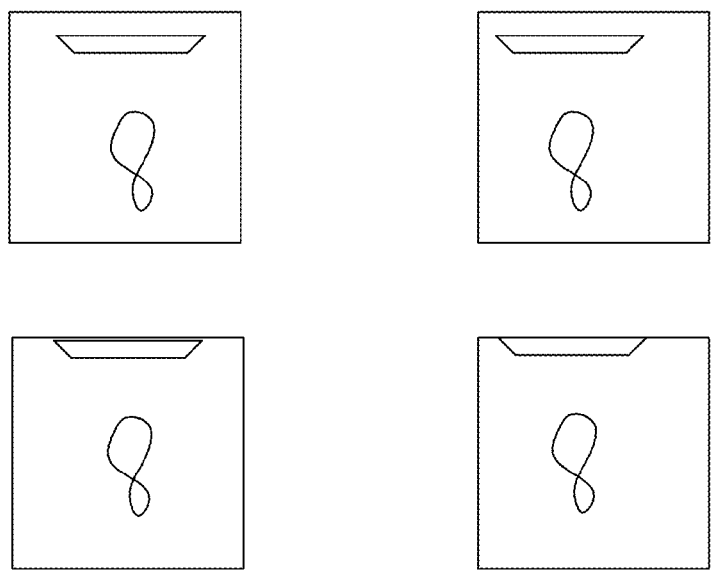
FIG. 13 is a conceptual diagram illustrating a plurality of foveated views from which interpolation is performed to render image content.
Figure 14:
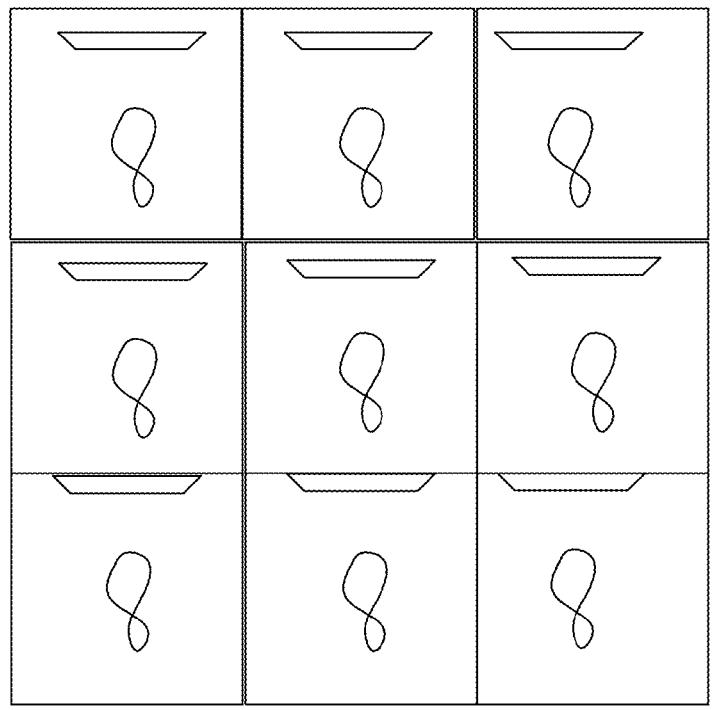
FIG. 14 is a conceptual diagram illustrating area of FIG. 13 that is interpolated to generate additional views that are rendered as image content.

FIG. 13 is a conceptual diagram illustrating a plurality of foveated views from which interpolation is performed to render image content. As illustrated in FIG. 13, 2×2 videos (i.e., four videos) are decoded to support rapid head movement, where there is some spatial separation between the views. This may allow device 44 (see FIG. 3) to handle saccades, i.e., rapid eye movement of the eye between fixation points. Each of the four videos may represent a cone of fovea. FIG. 14 is a conceptual diagram illustrating area of FIG. 13 that is interpolated to generate additional views that are rendered as image content. As illustrated, there are 3×3 videos (i.e., nine videos) that are generated from interpolating the four videos of FIG. 13.

In FIG. 13, the configuration of the cone of fovea results in interpolating between four video streams to generate the nine video streams illustrated in FIG. 14. For other configurations, fewer or more video streams may be interpolated (e.g., interpolate between two video streams, three video streams, and so forth). To perform the interpolation, the graphics pipeline treats each view as a basis function that covers one region of the sphere (e.g., such as that of FIGS. 1A and 1B), where the surface of the sphere is divided into minimally overlapping regions.

The graphics pipeline may use ray casting, lookup tables, or mesh geometry, as a few examples to perform the interpolation. The interpolation may be considered as image mosaicing. For example, there may be no need for image alignment and exposure compensation. Pixel mapping onto the sphere and fovea direction may be known. For the interpolated view (IV), the inner region has a 1:1 pixel mapping and may depend on the spacing between foveas. The empty regions (spacing) may require image resampling using pixels from the transition region of the interpolated view. The image resampling can be bilinear, b-splines, and the like. The interpolation formula can be constructed from a combination of distributions including, for example, exponential, Weibull, Gamma, and log-normal. In interpolation, multiple views can be combined via interpolation schemes such as cubic, bilinear, and Lanczos. A weight may be assigned to each view based on the distance from the pixel in focus. The eccentricity map may also be used to factor in whether a view has high or low quality in the in the pixel in focus.

The interpolation formula may be based on where the user is looking and induce a falloff of resolution. For example, when a user looks at a specific pixel on the screen of a device. Conceptually, an ellipse can be placed around that pixel; the eccentricity can be used to describe how far another pixel is to that pixel in focus. This distance can be used to determine which level of detail to compute for the image pyramid. The domain of the function may span [0, infinity] while the range of the function should span [0, 1]. For example, at f(x=0)=1 to keep the quality at maximum, as the pixel location on the screen moves away from the eye's focus, the curve gradually decreases towards some fixed non-zero lower bound (e.g. Video Graphics Array (VGA) quality 640×480 pixels). The eccentricity map may be a one-dimensional or two dimensional function. One dimensional includes using the distance to the pixel in focus to induce resolution falloff. A two-dimensional function may be used to impose spatial variation around the pixel in focus, for example circular, ellipses, etc.

Figure 15:
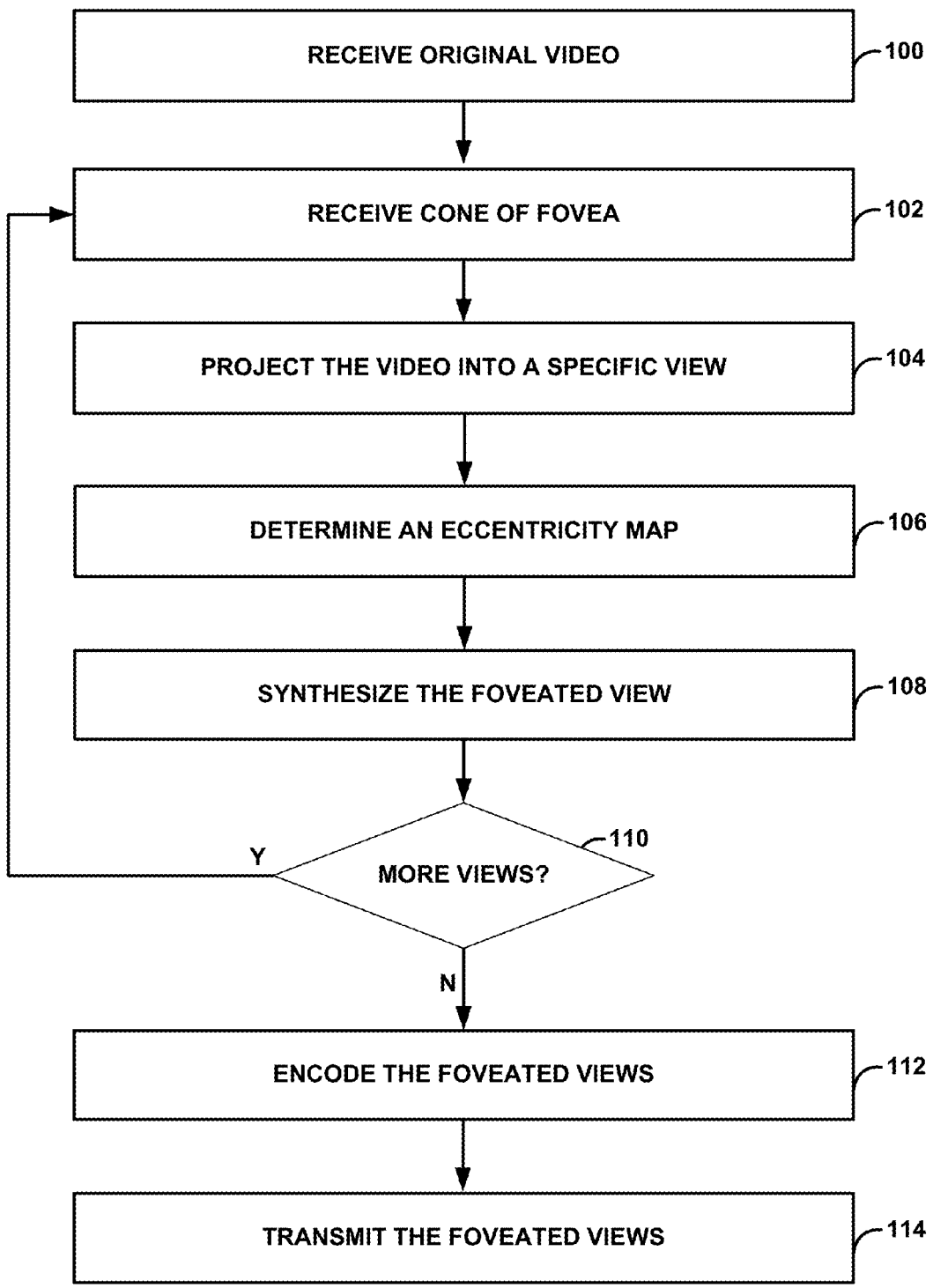
FIG. 15 is a flowchart illustrating an example method of operation according to the techniques of this disclosure.
Figure 16:
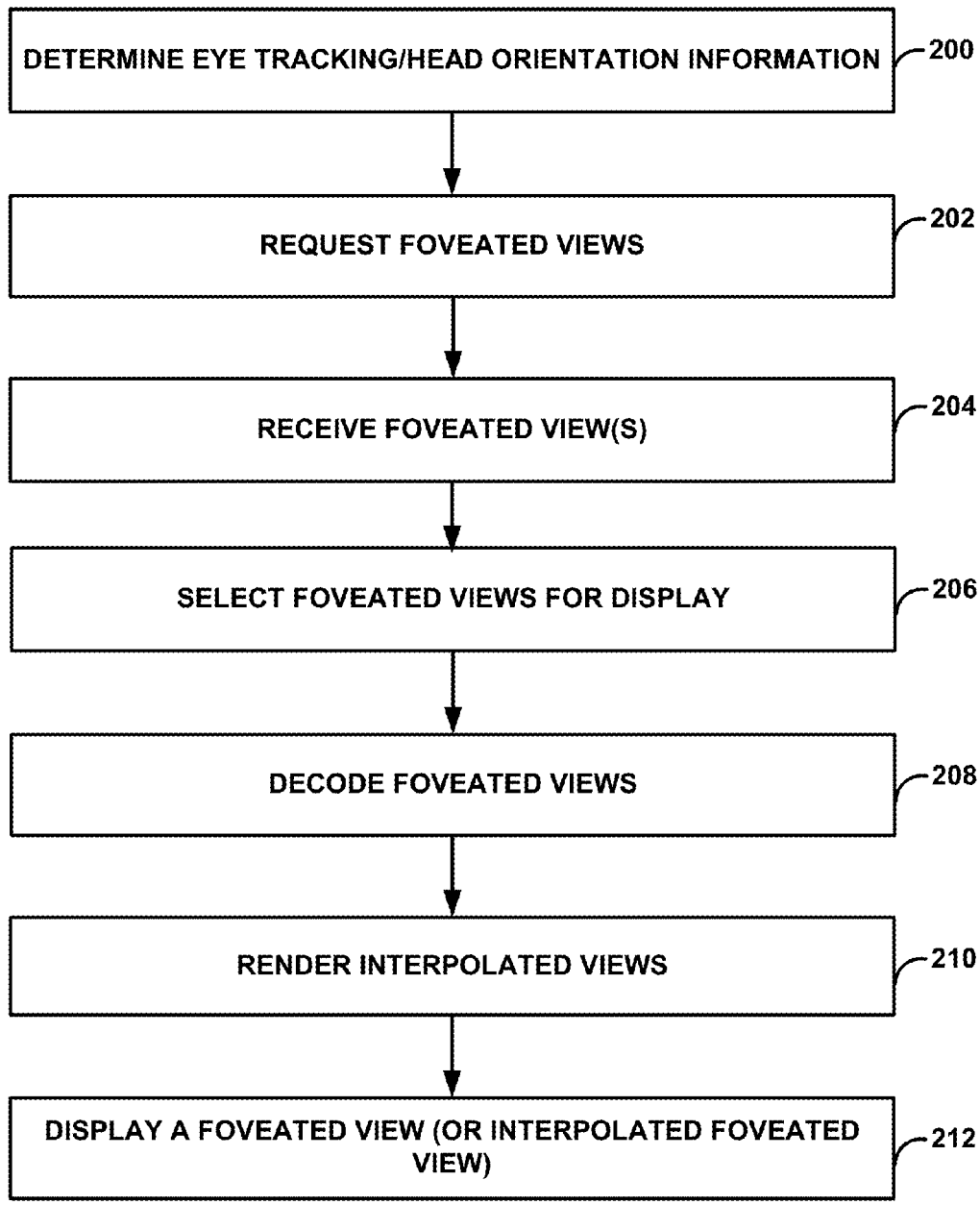
FIG. 16 is a flowchart illustrating an example method of operation according to the techniques of this disclosure.

FIG. 15 is a flowchart illustrating an example method according to the techniques of this disclosure. In one example of the disclosure, device 10 (see FIG. 2) may be configured to receive original video (100). The original video may include 360 video, and VR generated video. The original video may be high quality video (e.g., UHD 4 K, 8 K, etc). Original video may include a single or stereoscopic video format. Device 10 may receive cone of fovea information (102). The cone of fovea information may include size and direction information describing the specific cone of fovea. In an example, the cone of fovea information may be provided by a user device requesting a synthesized view. In another example, the cone of fovea information is generated by device 10 as it generates all synthesized views needed. In another example, cone of fovea information is transmitted by a user device requesting a specific foveated view. In a further example, cone of fovea information is derived from user eye tracking and/or head orientation data sent from a requesting device.

Device 10 may project (e.g., convert) the video into a specific view (104). The specific view may include a 1:1 pixel mapping between the view of the original video and a specific view. View projector 14 may perform the projection. The projection may be to one or more types of views. The projection may include single and stereoscopic view projections. The types of projections may include cubemaps, equirectangular, pyramids, Peirce-Quincuncial, Adams doubly periodic, Gnomonic, Chamberlin trimetric, Berghaus' Star, conformal mapping, truncated pyramid, and Stereographic/Orthographic projections. The projection may comprise a two-dimensional shape.

Device 10 may determine an eccentricity map (106). The eccentricity map may be based on points of interest within the frame or based on a central location within the frame. The eccentricity map may determine the rate of resolution falloff of from one or more points of interest/central point to the outter regions of the frame. The eccentricity map may include multiple eccentricity maps for different regions of interest within a video. The areas of interest may indicate that the subject of a frame of the spherical video. Areas of interest may be determined by movement in a scene, facial recognition, or may be determined by metadata accompanying high quality original video 18. Central location falloff and areas of interest falloff may be combined via, e.g., a linear blend. Areas of interest may also be provided to a decoding device as context metadata (in an encoded bitstream or file) to allow the areas of interest to have high resolution and other areas less.

Device 10 (and/or synthesizer 16) may synthesize the foveated view (108). Device 10 may combine the projected specific view with the eccentricity map. Where the projected specific view includes a a stereoscopic view, device 10 may be configured to combine each individual portion of the stereoscopic view into a combined, synthesized foveated view. For example, as shown in FIGS. 9 and 11 with respect to stereoscopic Peirce-Quincuncial and Berghaus' Star projections, the specific views may be combined into a rectangular or rhombus shape, respectively. In one example, device 10 may only synthesize foveated views requested by a user/viewer device (e.g. device 44 (see FIG. 3)). In another example device 10 may synthesize all foveated views prior to any request for video from a user device. The syntehesized specific views may include a first portion having a first pixel resolution and a second portion having a second pixel resolution, the second pixel resolution being less then the first pixel resolution. Areas of interest may by synthesized with the first (higher) pixel resolution.

Device 10 may determine whether there are more views to synthesize (110). If yes, then new cone of fovea information may be received (102). If no, device 10 may be configured to encode the foveated views (112). Device 10 (and/or Video encoder 24) may utilize any known or developing video encoding process to encode the video content. For example, video encoder 24 may utilize ITU-T H.264 (AVC), H.265 (HEVC), MPEG or other video coding techniques to encode one or more of the foveated views into a video stream.

Device 10 may determine which of the synthesized foveated views to transmit. Such a determination may be based on data indicative of the one or more areas of interest.

Device 10 may transmit the synthesized foveated views (114). The synthesized foveated views may be transmitted as a bitstream to another device (such as device 44). In an example, all synthesized foveated views are transmitted. In another example, only a single synthesized foveated view is sent. In another example, a plurality of synthesized foveated views are sent based on a prediction (or multiple predictions) of a user's eye move in the future. Multiple synthesized foveated views may be sent as device 44 may decode multiple views simultaneously. In some examples, foveated views are synthesized and transmitted in real time. In other examples, foveated views are batch processed and stored and transmitted when requested by a user device (such as device 44). In a further example, transmitting the foveated views are based on determining which views to transmit.

Device 44 may determine eye tracking and/or head orientation information (200). Device 44 may use eye tracking circuitry 30 and/or head orientation tracking circuitry 32 to determine an orientation of viewer head. Such information may be used to determine a foveated view (or set of foveated views needed).

Device 44 may request foveated views, from e.g. device 10 (202). In an example, the request may include eye tracking and/or head orientation information. In an example, the request may be for one or more specific foveated views. In an example, the request may contain no eye tracking and/or head orientation information. In an example, device 44 may determine a viewing region of a user based on one or both of eye tracking or head orientation data.

Device 44 may receive one or more foveated views from device 10 (204). Device 44 may be configured to select foveated views for display (206). The selection may be based on the eye tracking and/or head orientation information of a viewer.

Device 44 may be configured to decode the received/selected foveated views (208). Two or more of the foveated views may be decoded in parallel by device 44.

Device 44 may render interpolated views (210). Rendering interpolated views may include rendering interpolated views from the selected foveated views. Interpolated views may "fill in gaps" of cones of fovea not received from device 10. Interpolated views may "fill in gaps" between cones of fovea. Interpolation may average pixel information between two or more views to create additional interpolated views. Device 44 may be configured to rapidly interpolate between different scales of texture (e.g. image pyramid). Device 44, when rendering interpolated views may also apply the eccentricity mapping to interpolated views. Rending the interpolated views may be based on the viewing region of the user and/or the plurality of foveated views. Interpolation may include determining weights for specific views. The weights may be based on a distance between a pixel within the viewing region and a corresponding pixel in a respective foveated view of the one or more of the plurality of foveated views and an eccentricity value of the corresponding pixel in the respective foveated view of the one or more of the plurality of foveated views.

Device 44 may display a foveated view or interpolated foveated view (212). Displaying the foveated view or interpolated foveated view may be based on the head orientation eye tracking information. The decision to use interpolated foveated views or non-interpolated foveated views may be based on which view is closed to a user's eye/head position. Displaying the interpolated view may be based on determined weights of each of the views.

Figure 17:
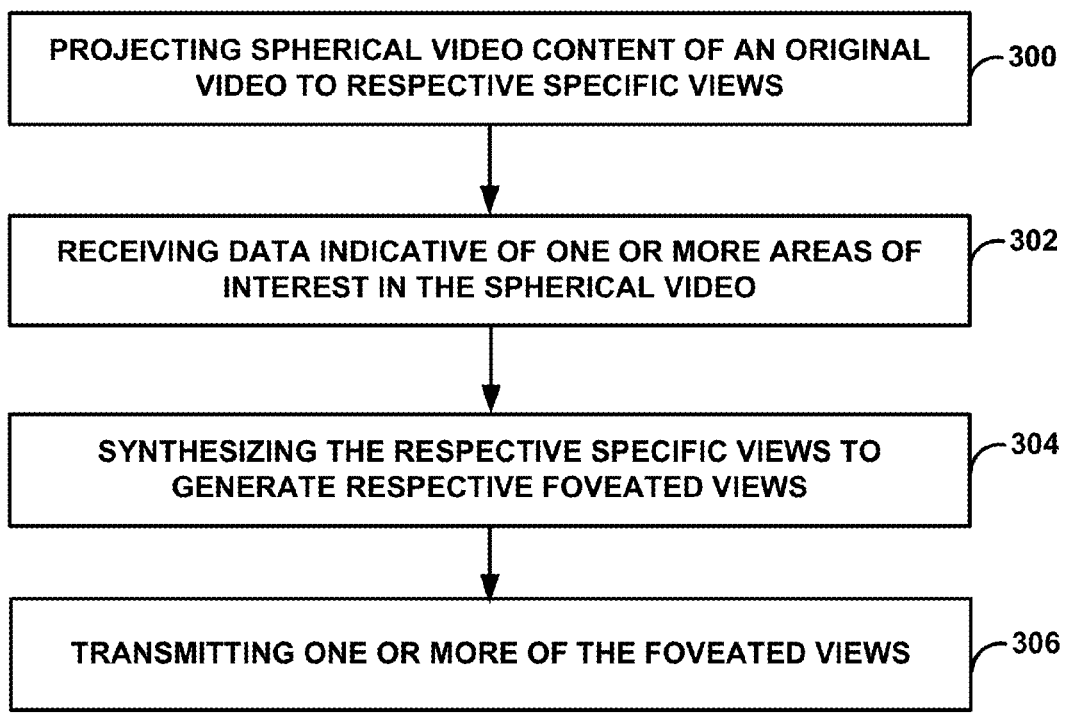
FIG. 17 is a flowchart illustrating an example method of operation according to the techniques of this disclosure.

FIG. 17 is a flowchart illustrating an example method according to the techniques of this disclosure. In one example of the disclosure, device 10 (see FIG. 2) may be configured to project spherical video content of an original video to respective specific views (300). In an example, each of the plurality of cone of fovea corresponds to a viewing direction and the respective specific views comprise a two-dimensional shape. Device 10 may be configured to receive data indicative of one or more areas of interest in the spherical video (302). In an example, the areas of interest indicate a subject of a frame of the spherical video. Device 10 may be configured to synthesize the respective specific views to generate respective foveated views (304). In an example, each of the foveated views includes a first portion having a first pixel resolution comprising the one or more areas of interest and a second portion having a second pixel resolution less than the first pixel resolution of the first portion. Device 10 may be configured to transmit one or more of the foveated views. The transmission may be to a viewing device (see e.g., device 44 of FIG. 3).

Figure 18:
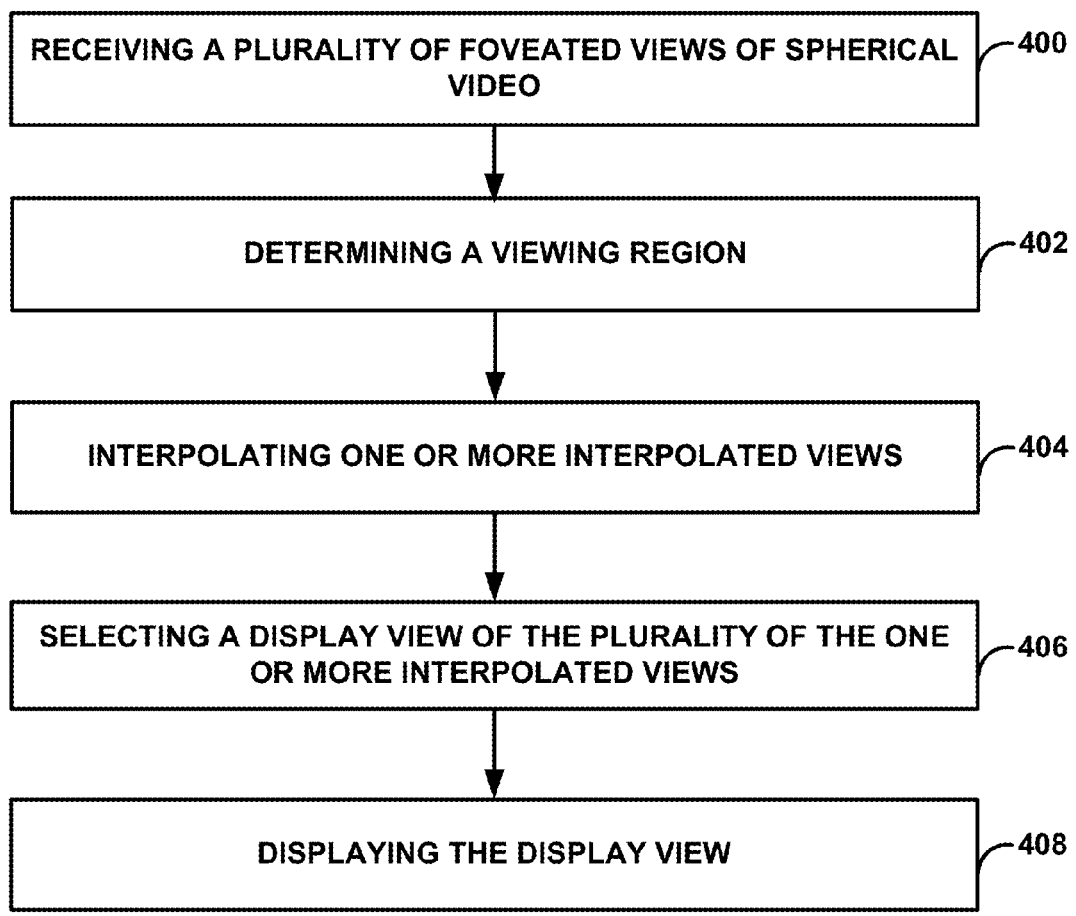
FIG. 18 is a flowchart illustrating an example method of operation according to the techniques of this disclosure.

FIG. 18 is a flowchart illustrating an example method according to the techniques of this disclosure. In one example of the disclosure, device 44 (see FIG. 3) may be configured to receive a plurality of foveated views of spherical video (400). In an example, the plurality of foveated views each comprise a central area with a higher resolution than a non-central area. Device 44 may be configured to determine a viewing region (402). In an example, device 44 may determine the viewing region based on eye tracking data and/or head orientation data. Device 44 may be configured to interpolate one or more interpolated views based on the plurality of foveated views and the viewing region (404). Device 44 may be configured to select a display view of the plurality of the one or more interpolated views (406). In an example, device 44 may select based on the viewing region. Device 44 may be configured to display the display view (408).

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media. In this manner, computer-readable media generally may correspond to tangible computer-readable storage media which is non-transitory. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. It should be understood that computer-readable storage media and data storage media do not include carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method for generating video content, the method comprising:
generating respective specific views, for each of a plurality of cones of fovea, projected from spherical video content of an original video, wherein each of the plurality of cones of fovea corresponds to a viewing direction and the respective specific views comprise a two-dimensional shape, wherein generating the specific views comprises 1:1 pixel mapping the spherical video content for each of the plurality of cones of fovea to the respective specific views such that the specific views include the video content of the spherical video content having the 1:1 pixel mapping;
receiving data indicative of one or more areas of interest in the spherical video content, the areas of interest indicating a subject of a frame of the spherical video content;
synthesizing the respective specific views to generate respective foveated views, wherein each of the foveated views includes 1:1 pixel mapped spherical content of one of the plurality of cones of fovea, and wherein each of the foveated views includes a first portion having a first pixel resolution and comprising the one or more areas of interest and a second portion having a second pixel resolution less than the first pixel resolution of the first portion; and
transmitting one or more of the foveated views,
wherein a first foveated view comprises images forming a first set of triangle projections, wherein a second foveated view comprises images forming a second set of triangle projections, and wherein the method further comprises placing a first image from the images forming the first set of triangle projections side-by-side with a second image from the images forming the second set of triangle projections to form respective rhombus shaped projections and render video based on the rhombus shaped projections.

2. The method of claim 1, wherein the second portion having the second pixel resolution comprises a portion having reduced pixel resolution from one end to another end.

3. The method of claim 1, wherein transmitting one or more of the foveated views is based on output from eye tracking circuitry or head orientation tracking circuitry.

4. The method of claim 3, wherein the generated foveated views comprises a picture in a Peirce-Quincuncial projection.

5. The method of claim 1, wherein synthesizing specific views comprises synthesizing respective specific views based on an eccentricity map that defines a transition in pixel resolution from the first portion through the second portion.

6. The method of claim 1, wherein the plurality of cones of fovea correspond to respective locations on a sphere.

7. The method of claim 1, wherein the spherical video content is for at least one of 360 video or virtual reality.

8. The method of claim 1, wherein:
the spherical video content comprises stereoscopic video,
synthesizing the respective specific views comprises combining both stereoscopic respective specific views into a single combined view.

9. The method of claim 1, wherein placing the first image from the images forming the first set of triangle projections side-by-side with the second image from the images forming the second set of triangle projections comprises placing the first image from the images forming the first set of triangle projections side-by-side with the second image from the images forming the second set of triangle projections to form the respective rhombus shaped projections and render stereoscopic video based on the rhombus shaped projections, wherein the respective specific views comprises the stereoscopic video.

10. The method of claim 1, further comprising:
encoding one or more of the foveated views into a video stream,
wherein transmitting one or more of the foveated views comprises transmitting the video stream.

11. The method of claim 1, wherein synthesizing the respective specific views to generate respective foveated views comprises downsampling areas of the respective foveated views in areas away from the first portion having the first pixel resolution.

12. A method for displaying video content, the method comprising:
receiving a plurality of foveated views of spherical video content, the plurality of foveated views each comprising a central area with a higher resolution than a non-central area, wherein the plurality of foveated views are generated based on a 1:1 pixel mapping of the spherical video content for each of a plurality of cones of fovea in the spherical video content to respective specific ones of the foveated views such that the specific ones of the foveated views include the video content of the spherical video content having the 1:1 pixel mapping, wherein each of the foveated views includes 1:1 pixel mapped spherical content of one of the plurality of cones of fovea, wherein a first foveated view comprises images forming a first set of triangle projections, wherein a second foveated view comprises images forming a second set of triangle projections, and wherein a first image from the images forming the first set of triangle projections are side-by-side with a second image from the images forming the second set of triangle projections to form respective rhombus shaped projections for rendering video based on the rhombus shaped projections;
determining a viewing region based one or both of eye tracking data or head orientation data;
interpolating one or more interpolated views based on the plurality of foveated views and the viewing region;
selecting a display view of the plurality of the one or more interpolated views based on the viewing region; and
displaying the display view.

13. The method of claim 12 further comprising:
sending one or both of the eye tracking data or the head orientation data to a server,
wherein receiving the plurality of foveated views is based, at least in part, on the sending of the eye tracking and the head orientation data.

14. The method of claim 12, wherein interpolating the plurality of foveated views comprises reducing a resolution in areas of the plurality of foveated views based on one or both of eye tracking data or head orientation data.

15. The method of claim 12, wherein interpolating the plurality of foveated views comprises resampling from a region between the central area with the higher resolution than the non-central area of the plurality of foveated views.

16. The method of claim 12, wherein the spherical video content comprises at least one of 360 video or virtual reality, mapped to a Peirce-Quincuncial projection.

17. The method of claim 12, wherein the higher resolution comprises 8 K video equivalent resolution, the lower resolution comprises Video Graphics Array (VGA) quality resolution and the plurality of foveated views each comprise a transition area between the central area and the non-central area with a gradually declining resolution from the 8 K video equivalent resolution to the VGA quality resolution.

18. The method of claim 12, wherein:
interpolating one or more interpolated views comprises determining a weighting of one or more of the plurality of foveated views based on at least one of:
a distance between a pixel within the viewing region and a corresponding pixel in a respective foveated view of the one or more of the plurality of foveated views; and
an eccentricity value of the corresponding pixel in the respective foveated view of the one or more of the plurality of foveated views, and
selecting the display view is further based on the determined weighting.

19. A device for generating video content, the device comprising:
a memory configured to store an original video;
one or more processors in communication with the memory and are configured to:
generate respective specific views, for each of a plurality of cones of fovea, projected from spherical video content of the original video, wherein each of the plurality of cones of fovea corresponds to a viewing direction and the respective specific views comprise a two-dimensional shape, wherein to generate the specific views, the one or more processors are configured to 1:1 pixel map the spherical video content for each of the plurality of cones of fovea to the respective specific views such that the specific views include the video content of the spherical video content having the 1:1 pixel mapping;
receive data indicative of one or more areas of interest in the spherical video content, the areas of interest indicating a subject of a frame of the spherical video content;
synthesize the respective specific views to generate respective foveated views, wherein each of the foveated views includes 1:1 pixel mapped spherical content of one of the plurality of cones of fovea, and wherein each of the foveated views includes a first portion having a first pixel resolution comprising the one or more areas of interest and a second portion having a second pixel resolution less than the first pixel resolution of the first portion; and
transmit one or more of the foveated views,
wherein a first foveated view comprises images forming a first set of triangle projections, wherein a second foveated view comprises images forming a second set of triangle projections, and wherein the one or more processors are configured to place a first image from the images forming the first set of triangle projections side-by-side with a second image from the images forming the second set of triangle projections to form respective rhombus shaped projections and render video based on the rhombus shaped projections.

20. The device of claim 19, wherein the one or more processors configured to transmit one or more of the foveated views is based on output from eye tracking circuitry or head orientation tracking circuitry.

21. The device of claim 19, wherein the generated foveated views comprises a picture in a Peirce-Quincuncial projection.

22. The device of claim 19, wherein the one or more processors configured to synthesize specific views comprises the one or more processors configured to synthesize respective specific views based on an eccentricity map that defines a transition in pixel resolution from the first portion through the second portion.

23. The device of claim 19, wherein the one or more processors are configured to encode one or more of the foveated views into a video stream,
wherein the one or more processors configured to transmit one or more of the foveated views comprises the one or more processors configured to transmit the video stream.

24. The device of claim 19, wherein the one or more processors configured to synthesize the respective specific views to generate respective foveated views comprises the one or more processors configured to downsample areas of the respective foveated views in areas away from the first portion having the first pixel resolution.

25. A device for displaying video content, the device comprising:
a memory configured to store a plurality of foveated views of spherical video content;
one or more processors in communication with the memory and are configured to:
receive the plurality of foveated views of the spherical video content from the memory, the plurality of foveated views each comprising a central area with a higher resolution than a non-central area, wherein the plurality of foveated views are generated based on a 1:1 pixel mapping of the spherical video content for each of a plurality of cones of fovea in the spherical video content to respective specific ones of the foveated views such that the specific ones of the foveated views include the video content of the spherical video content having the 1:1 pixel mapping, wherein each of the foveated views includes 1:1 pixel mapped spherical content of one of the plurality of cones of fovea, wherein a first foveated view comprises images forming a first set of triangle projections, wherein a second foveated view comprises images forming a second set of triangle projections, and wherein a first image from the images forming the first set of triangle projections are side-by-side with a second image from the images forming the second set of triangle projections to form respective rhombus shaped projections for rendering video based on the rhombus shaped projections;
determine a viewing region based one or both of eye tracking data or head orientation data;
interpolate one or more interpolated views based on the plurality of foveated views and the viewing region;
select a display view of the plurality of the one or more interpolated views based on the viewing region; and
output for display the display view.

26. The device of claim 25, wherein the one or more processors are configured to send one or both of the eye tracking data or the head orientation data to a server,
wherein the one or more processors are configured to receive the plurality of foveated views based, at least in part, on the sending of the eye tracking and the head orientation data.

27. The device of claim 25, wherein the one or more processors configured to interpolate one or more interpolated views comprises the one or more processors configured to determine a weighting of one or more of the plurality of foveated views based on at least one of:
- a distance between a pixel within the viewing region and a corresponding pixel in a respective foveated view of the one or more of the plurality of foveated views; and
- an eccentricity value of the corresponding pixel in the respective foveated view of the one or more of the plurality of foveated views, and selecting the display view is further based on the determined weighting.

28. The device of claim 25, wherein the device comprises a display configured to display the display view.

29. The device of claim 25, wherein the device comprises one or more of a camera, a computer, a mobile device, a broadcast receiver device, or a set-top box.

* * * * *